(12) United States Patent
Song et al.

(10) Patent No.: US 11,602,860 B2
(45) Date of Patent: Mar. 14, 2023

(54) TOOL CHANGING SYSTEM OF ROBOT MANIPULATOR

(71) Applicant: Korea University Research and Business Foundation, Seoul (KR)

(72) Inventors: Jae-Bok Song, Seoul (KR); Sung-Jae Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 216 days.

(21) Appl. No.: 17/169,917

(22) Filed: Feb. 8, 2021

(65) Prior Publication Data
US 2021/0252718 A1    Aug. 19, 2021

(30) Foreign Application Priority Data

Feb. 19, 2020 (KR) .................. 10-2020-0020172
Dec. 28, 2020 (KR) .................. 10-2020-0184138

(51) Int. Cl.
*B25J 9/08* (2006.01)
*B25J 15/00* (2006.01)
*B25J 15/04* (2006.01)

(52) U.S. Cl.
CPC ....... *B25J 15/0019* (2013.01); *B25J 15/0441* (2013.01)

(58) Field of Classification Search
CPC ... B25J 9/08; B25J 9/1679; B25J 5/007; B25J 9/163; B25J 9/162; B25J 9/1666; B25J 19/02; B65G 67/24; B65G 1/1373; G05D 1/0225; G05D 1/0291; G05D 1/0223; G05D 1/0276; G05D 1/0088; G05D 1/021; G05D 1/0274; G05D 1/0282; G05D 1/0022;

(Continued)

(56) References Cited

U.S. PATENT DOCUMENTS 9,314,922 B2 * 4/2016 Dockter .................. B25J 9/1689
2001/0020200 A1 * 9/2001 Das .......................... G06F 3/011
700/248

(Continued)

FOREIGN PATENT DOCUMENTS

KR      10-0707377 B1     4/2007

OTHER PUBLICATIONS

Salerno et al., Force calculation for localized magnetic driven capsule endoscopes, 2013, IEEE, p. 5354-5359 (Year: 2013).*
Sakr et al., A Handheld Master Device for 3D Remote Micro-Manipulation, 2018, IEEE, p. 1-6 (Year: 2018).*
Park et al., Force feedback based gripper control on a robotic arm,2016, IEEE, p. 107-112 (Year: 2016).*
Yu et al., Master-Slave System Research of a Vascular Interventional Surgical Robot, 2019, IEEE, p. 469-473 (Year: 2019).*

*Primary Examiner* — McDieunel Marc
(74) *Attorney, Agent, or Firm* — Hauptman Ham, LLP

(57) ABSTRACT

A tool changing system of a robot manipulator is proposed. The tool changing system includes: a master coupled to an end of the robot manipulator at a first side thereof; and a slave coupled to a tool at a first side thereof and coupled removably to a second side of the master at a second side thereof, wherein the master includes an actuator and a master magnet rotating according to the rotation of the actuator, and the slave includes a slave magnet rotating in synchronization with the rotation of the master magnet by magnetism therebetween with the master and the slave coupled to each other, whereby the rotating force of the slave magnet as a rotating force necessary for operating the tool is transmitted to the tool.

17 Claims, 47 Drawing Sheets

(58) Field of Classification Search
CPC .. G05D 1/0011; G05D 1/0287; G05D 1/0295; G05D 1/027; G05D 2201/0206; G05D 2201/0211; B60Q 5/005; B65D 90/023; B65D 90/18; B65D 88/524; B65D 90/08; G07C 9/27; G07C 9/00857; G07C 9/00571; G07C 9/00563; G07C 9/37; G07C 9/00182; G07C 2009/0092; G08G 1/202; G06Q 10/0832; G06Q 30/0633; G06Q 10/0833; G06Q 10/0836; G06Q 10/0875; G06Q 10/0838; G06Q 10/083; G06Q 10/0837; G06Q 50/28; B60W 10/04; B60W 10/20; B60W 30/09; B60W 2554/00; H02J 9/00; G16H 1/021; G16H 40/20; H04W 52/322; H04W 84/20; B60G 17/0152; B60G 2219/39172; B60G 2300/02; B60G 2800/019; B60G 2500/30; B60P 3/007; G01C 21/3438; G06F 21/31; G06F 21/32; H04B 1/3822; G05B 2219/50391

See application file for complete search history.

(56) References Cited

U.S. PATENT DOCUMENTS

| | | | |
|---|---|---|---|
| 2002/0072736 A1* | 6/2002 | Tierney | A61B 34/76 606/1 |
| 2002/0120363 A1* | 8/2002 | Salisbury | B25J 9/1643 700/254 |
| 2003/0195664 A1* | 10/2003 | Nowlin | A61B 34/37 318/568.11 |
| 2004/0164960 A1* | 8/2004 | Jacobus | G06F 3/011 345/161 |
| 2005/0149003 A1* | 7/2005 | Tierney | A61B 90/98 606/1 |
| 2005/0251110 A1* | 11/2005 | Nixon | B25J 9/1692 606/1 |
| 2006/0030840 A1* | 2/2006 | Nowlin | A61B 34/70 606/1 |
| 2006/0161302 A1* | 7/2006 | Perry | B25J 15/04 700/245 |
| 2016/0346924 A1* | 12/2016 | Hasegawa | B25J 9/1612 |
| 2021/0007816 A1* | 1/2021 | Huang | A61B 34/35 |

* cited by examiner

FIG. 3
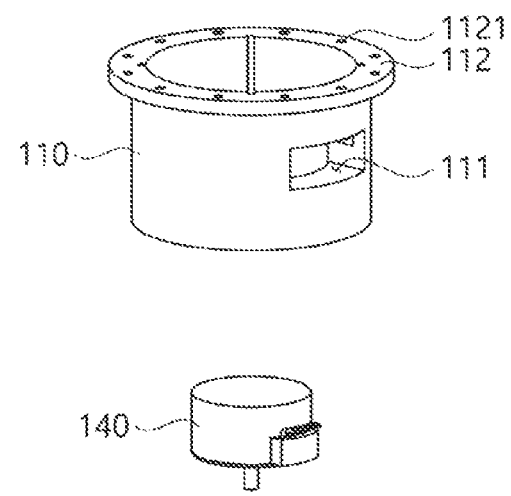
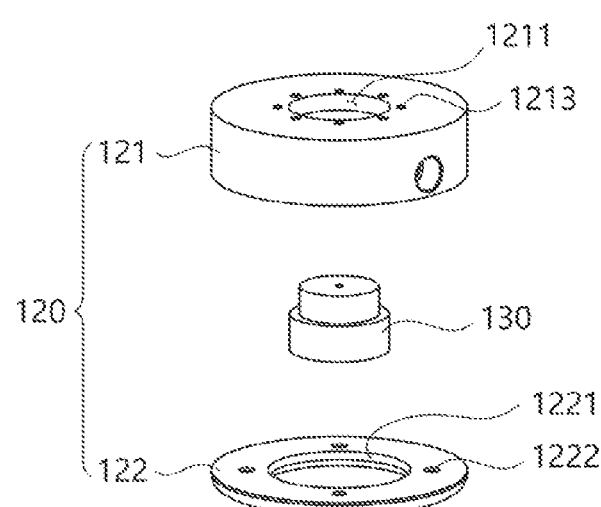

FIG. 23
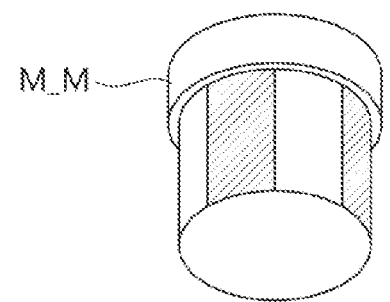
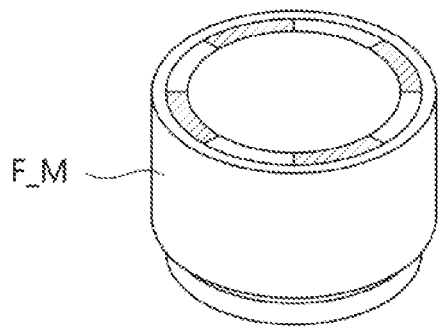

TOOL CHANGING SYSTEM OF ROBOT MANIPULATOR

CROSS REFERENCE TO RELATED APPLICATION

The present application claims priority to Korean Patent Applications No. 10-2020-0020172, filed Feb. 19, 2020, and No. 10-2020-0184138, filed Dec. 28, 2020, the entire contents of which is incorporated herein for all purposes by this reference.

BACKGROUND OF THE INVENTION

Field of the Invention

The present disclosure relates generally to a tool changing system of a robot manipulator. More particularly, the present disclosure relates to a tool changing system of a robot manipulator, which is mounted to the end of the robot manipulator and can perform tasks by automatically replacing various tools.

Description of the Related Art

Despite the development of a robot hand over the past few decades, the robot hand is very expensive and has very poor durability and function compared to a human hand, so the robot hand is rarely used except for research purposes.

As a demand for complex tasks such as moving and assembling parts at an industrial site using a robot arm or performing service work such as cooking at a service site increases, there is a practical need for a method in which instead of the robot hand, various tools are replaced with each other and used according to situations. To meet such a demand, various types of tool changers have been developed, and pneumatic or electric tool changers are usually used in industrial sites.

In the existing tool changer, the master and the slave are coupled to or decoupled from each other by a pneumatic or electric motor, and the master supplies power to an actuator such as a motor of a tool mounted to the slave through electrical terminals to drive the actuator.

As parts such as electrical terminals for transmitting power and signals are used in the existing tool changer, the structure of the tool changer becomes complicated, and the unit cost of the product increases. Furthermore, during the coupling and decoupling of the master and the slave, care is required to be taken to prevent the electrical terminals from being damaged.

In addition, since every tool used in the tool changer is required to have a separate actuator for its own operation, using the tool changer with multiple tools incurs a large cost.

Accordingly, a tool changing system of a new concept that can significantly lower manufacturing cost is required in industrial sites.

Meanwhile, a reducer is used in many industrial sites in combination with motors or various tools. Since the reduction ratio of the reducer is fixed, the reducer must be replaced in order to use various reduction ratios. As an example of a reducer, "tool magazine driving device of machining center" disclosed in Korean Patent No. 10-0707377 is an example of a reducer through mechanical coupling.

In most cases, a motor and a reducer are mechanically tightly coupled to each other, so for the replacement of the reducer, the motor and the reducer are required to be disassembled and reassembled. Even if a motor having the same capacity is used, it is often necessary to use a different reduction ratio depending on the type of work. In this case, it is difficult to assemble a different reducer with the used motor, so another motor-reducer system is used, which leads to an increase in cost.

If a reducer is easily assembled with and disassembled from a motor, various reducers can be easily coupled to the same motor to be used, so manufacturing cost and time can be drastically decreased.

SUMMARY OF THE INVENTION

Accordingly, the present disclosure has been made keeping in mind the above problems occurring in the related art, and the present disclosure is intended to propose a tool changing system of a robot manipulator, in which power of an actuator such as a motor mounted to a master is transmitted to a slave by a magnet, and a separate actuator is not mounted to a tool or the slave, whereby the structure of the tool changing system is simple and manufacturing cost thereof can be dramatically decreased.

In addition, the present disclosure is intended to propose a tool changing system of a robot manipulator, in which for the coupling and decoupling of the master and the slave, conventional pneumatic or electric motors are not used, but attraction of a magnet installed for power transmission between the master and the slave is used, whereby the structure of the attachment and detachment is simplified and manufacturing cost is significantly reduced.

Furthermore, the present disclosure is intended to propose a tool changing system of a robot manipulator, in which the coupling and power transmission of a reducer installed between the master and the slave are performed by a magnet as between a tool and a slave, and for coupling and decoupling between the master and the reducer and between the reducer and the slave, the conventional pneumatic or electric motors are not used, but attraction of the magnet for power transmission is used, whereby the structure of the coupling and decoupling of the components from each other is simplified and manufacturing cost is significantly reduced.

In order to achieve the above objectives, according to one aspect of the present disclosure, there is provided a tool changing system of a robot manipulator, the system including: a master coupled to the robot manipulator at a first side thereof and having a master coupling part at a second side thereof; and a slave coupled to a tool at a first side of the slave and having a slave coupling part at a second side of the slave, the slave coupling part being coupled removably to the master coupling part, wherein in a state in which the master coupling part and the slave coupling part are coupled to each other, transmission of rotating force between the master and the slave may be performed by magnetism through magnetic coupling.

Here, the system may further include: a reducer having: a reduction input part coupled to the master coupling part; a reduction part reducing a rotating force transmitted from the master through the reduction input part; and a reduction output part provided to be coupled to the slave coupling part and transmitting the rotating force reduced by the reduction part to the slave, wherein when the master coupling part and the reduction input part are coupled to each other and the reduction output part and the slave coupling part are coupled to each other, a transmission of the rotating force between the master coupling part and the reduction input part and a transmission of the rotating force between the reduction output part and the slave coupling part are performed by the magnetism through the magnetic coupling.

In addition, a coupling mechanism between the master coupling part and the reduction input part and a coupling mechanism between the reduction output part and the slave coupling part may be formed to correspond to each other; a coupling structure of the master coupling part and the reduction output part may be formed such that the master coupling part and the reduction output part correspond to each other, and a coupling structure of the reduction input part and the slave coupling part to each other may be formed such that the reduction input part and the slave coupling part correspond to each other, so the master coupling part and the slave coupling part may be coupled directly to each other.

In addition, the master may include: an actuator, and a master magnet rotated according to rotation of the actuator, wherein a slave output part of the slave may include a slave magnet transmitting the rotating force to the tool; the reduction input part may include a reduction input magnet rotated in synchronization with the rotation of the master magnet by magnetism therebetween when the reduction input part and the master coupling part are coupled to each other; the reduction output part may include a reduction output magnet rotated by the rotating force decreased by the reduction part and rotating the slave magnet by magnetism therebetween when the reduction output part and the slave coupling part are coupled to each other.

In addition, the master magnet and the reduction output magnet may be provided to have a shape of one of a female magnet member having a cylindrical shape and a male magnet member having a cylindrical shape inserted to the female magnet member; the reduction input magnet and the slave magnet may be provided to have a shape of a remaining one of the female magnet member and the male magnet member; and when the master coupling part and the reduction input part are coupled to each other, and when the reduction output part and the slave coupling part are coupled to each other, the male magnet member may be inserted into the female magnet member to embody the magnetic coupling.

In addition, each of the female magnet member and the male magnet member may have an N-pole magnet and an S-pole magnet alternately formed along a circumferential direction thereof.

In addition, the master magnet and the reduction input magnet may be arranged to face each other when the master coupling part and the reduction input part are coupled to each other; the slave magnet and the reduction output magnet may be arranged to face each other when the slave coupling part and the reduction output part are coupled to each other; and the master magnet and the slave magnet may be arranged to face each other when the master coupling part and the slave coupling part are coupled to each other.

In addition, magnetic attraction between the master magnet and the reduction input magnet may be applied to maintain the coupling of the master and the reducer to each other; magnetic attraction between the slave magnet and the reduction output magnet may be applied to maintain the coupling of the slave and the reducer to each other; and when the master coupling part and the slave coupling part are coupled to each other, magnetic attraction between the master magnet and the slave magnet may be applied to maintain the coupling of the master and the slave to each other.

In addition, the reducer may further include a reducer removal prevention unit installed in the reduction output part, the reducer removal prevention unit preventing a removal of the slave by protruding from the reduction output part to the slave coupling part, with the reduction output part and the slave coupling part coupled to each other; the master may further include a master removal prevention unit installed in the master coupling part, the master removal prevention unit preventing a removal of the reducer by protruding from the master coupling part to the reduction input part, with the master coupling part and the reduction input part coupled to each other; the slave may further include a slave pin coupling groove formed in the slave coupling part, the slave pin coupling groove allowing the reducer removal prevention unit to be inserted thereto when the reduction output part and the slave coupling part are coupled to each other; and the reducer may further include a reducer pin coupling groove formed in the reduction input part, the reducer pin coupling groove allowing the master removal prevention unit to be inserted thereto when the master and the reduction input part are coupled to each other.

In addition, each of the master removal prevention unit and the reducer removal prevention unit may include: a pin module inserted into the reducer pin coupling groove or the slave pin coupling groove; a pin receiving part receiving the pin module such that the pin module is exposed forward at a front end thereof and moves forward and rearward; a removal prevention magnet coupled to a rear of the pin module; and a steel washer installed at a front of the pin receiving part such that the pin module is moved in a direction of being inserted to the reducer pin coupling groove or the slave pin coupling groove by magnetism of the removal prevention magnet.

In addition, the system may further include: a tool mount mounting the slave or the reducer thereto, wherein the reducer may further include a reducer mounting groove formed by being recessed at an outer surface of the reduction part, the reducer mounting groove having a pair of reducer mounting grooves symmetrical to each other; the slave may further include a slave mounting groove formed by being recessed at an outer surface thereof, the slave mounting groove having a pair of slave mounting grooves symmetrical to each other; and an interval between the reducer pin coupling groove and the reducer mounting groove and an interval between the slave pin coupling groove and the slave mounting groove may be provided to correspond to each other; wherein the tool mount may include: a base plate; a tool mounting part arranged to be spaced apart upward from the base plate and having a shape of a horseshoe open at a front of the tool mounting part; a mounting rib inserted to the slave mounting groove or the reducer mounting groove when the slave or the reducer is introduced to the tool mounting part from the front thereof such that the slave or the reducer is mounted to the tool mounting part, the mounting rib protruding inward from an inner wall surface of the tool mounting part; and a driving magnet mounted to the tool mounting part and installed by being spaced apart from the mounting rib to correspond to an interval between the slave mounting groove of the slave and the reducer removal prevention unit of the reducer when the slave and the reducer are coupled to each other, wherein when the slave or the reducer is mounted to the tool mounting part, the pin module may be moved back from the slave pin coupling groove or the reducer pin coupling groove by magnetism between the driving magnet and the removal prevention magnet, so the coupling of the slave and the reduction output part to each other or the coupling of the master and the reduction input part to each other may be released.

In addition, the reduction part may include at least one planetary gear module shaft-coupled to the reduction input magnet and the reduction output magnet, the planetary gear module decreasing the rotating force of the reduction input magnet and transmitting the decreased rotating force to the reduction output magnet.

In addition, the master coupling part may include a master connector installed toward the reducer or the slave; the reduction input part may further include a reduction input connector installed toward the master and electrically connected to the master connector when the master coupling part and the reduction input part are coupled to each other; the reduction output part may further include a reduction output connector installed toward the slave and electrically connected to the reduction input connector; and the slave coupling part may further include a slave connector installed toward the master or the reducer and electrically connected to the master connector or the reduction output connector when the slave coupling part is coupled to the master coupling part or the reduction output part.

In addition, the master may further include a slave removal prevention unit installed in the master coupling part, the slave removal prevention unit preventing a removal of the slave by protruding from the master coupling part to the slave coupling part, with the master coupling part and the slave coupling part fitted to each other.

In addition, the master coupling part may include: a master coupling housing having an opening formed by being open to the slave and having the master magnet arranged inside the master coupling housing; and a master coupling cover blocking the opening of the master coupling housing and having a slave through hole formed therethrough, wherein the slave coupling part may include a slave coupling housing having an opening formed by being open to the master, wherein the slave coupling housing may have an outside size allowing the slave coupling housing to be inserted into the master coupling housing through the slave through hole, and may have an inside size allowing the master magnet to be inserted into the slave coupling housing when the slave coupling housing is inserted into the master coupling housing.

In addition, the slave coupling part may further include at least one pin fastening hole formed through an outer side of the slave coupling housing from an inner side of the slave coupling housing in a radial direction thereof, and the slave removal prevention unit may be inserted into the pin fastening hole with the slave coupling housing inserted into the master coupling housing.

In addition, the slave removal prevention unit may include: a fastening pin installed to protrude inward from an inner wall surface of the master coupling housing and inserted into the pin fastening hole, and an elastic member pressing the fastening pin in a direction of inserting the fastening pin into the pin fastening hole.

In a tool changing system of a robot manipulator having such a configuration according to the present disclosure, power of the actuator such as a motor mounted to the master is transmitted to the slave by a magnet, and a separate actuator is not mounted to a tool or the slave, thereby simplifying the structure of the tool changing system and dramatically decreasing manufacturing cost thereof.

In addition, in a tool changing system of a robot manipulator according to the present disclosure, for attachment and detachment between the master and the slave, conventional pneumatic or electric motors are not used, but attraction of a magnet installed for power transmission between the master and the slave is used, whereby the structure of the attachment and detachment is simplified and manufacturing cost is significantly reduced.

Furthermore, in a tool changing system of a robot manipulator according to the present disclosure, the coupling and power transmission of a reducer installed between the master and the slave are performed by a magnet as between a tool and a slave, and for coupling and decoupling between the master and the reducer and between the reducer and the slave, the conventional pneumatic or electric motors are not used, but attraction of the magnet for the power transmission is used, whereby the structure of the coupling and decoupling of the components from each other is simplified and manufacturing cost is significantly reduced.

Additionally, in a tool changing system of a robot manipulator according to the present disclosure, a contactless coupling of a tool and the reducer to each other by magnetic coupling is performed, whereby a torque limit function is provided such that the tool and the reducer are prevented from being damaged due to strong external force while the function of the reducer is performed.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is an exploded perspective view of the master of the tool changing system of a robot manipulator according to the first embodiment of the present disclosure;

FIGS. 7 to 10A, 10B, 10C, and 10D are views illustrating the process of holding the tool of the tool changing system of a robot manipulator according to the first embodiment of the present disclosure;

FIGS. 23 and 24 are views illustrating the principle of the transmission of a rotating force by magnetism through magnetic coupling in the tool changing system according to the fifth embodiment of the present disclosure;

DETAILED DESCRIPTION OF THE INVENTION

Figure 1:
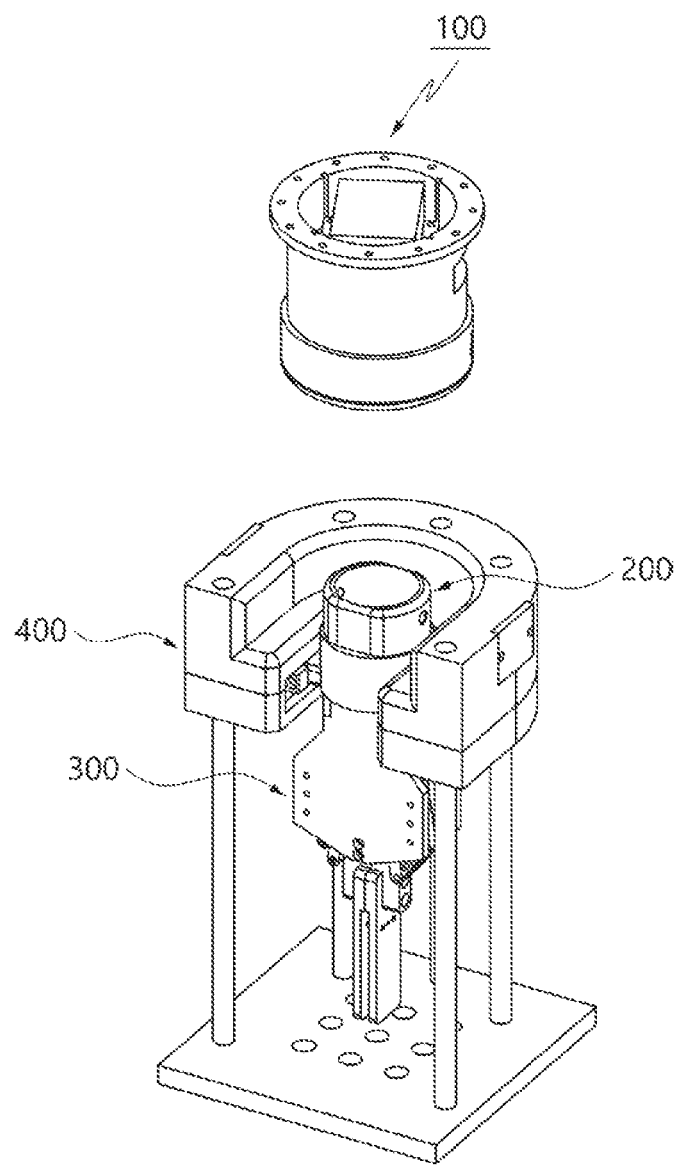
FIG. 1 is a perspective view of the tool changing system of a robot manipulator according to a first embodiment of the present disclosure.

Advantages and features of the present disclosure, and a method of achieving them will become obvious through embodiments described below in detail with reference to the accompanying drawings. However, the present disclosure is not limited to the embodiments disclosed below, but may be embodied in a variety of different forms. The embodiments allow the disclosure of the present disclosure to be complete, and are provided to completely inform the scope of the present disclosure to those with ordinary knowledge in the technical field to which the present disclosure belongs. The present disclosure is only defined by the scope of the claims. The same reference numerals refer to the same components throughout the specification.

Hereinafter, the embodiments according to the present disclosure will be described in detail with reference to the accompanying drawings.

First Embodiment

FIG. 1 is a perspective view of the tool changing system of a robot manipulator according to a first embodiment of the present disclosure. Referring to FIG. 1, the tool changing system according to the first embodiment of the present disclosure may include a master 100 and a slave 200.

The master 100 may be coupled to an end of the robot manipulator (not shown) at a first side of the master. The slave 200 may be coupled to the tool 300 at a first side of the slave, and may be coupled removably to a second side of the master 100 at a second side of the slave. In the embodiment illustrated in FIG. 1, the tool 300 coupled to the slave 200 is illustrated to have a shape of a gripper, but may be provided to have various shapes or types. The technical idea of the present disclosure is not limited to the shape or type of the tool 300.

With the tool 300 coupled to the slave 200, the tool 300 may be mounted to a tool mount 400. The master 100 coupled to the end of the robot manipulator may be coupled to the slave 200 mounted to the tool mount 400 according to the driving of the robot manipulator, or may be decoupled from the slave 200 mounted to the tool mount 400 such that various shapes of tools 300 are attached to and detached from the end of the robot manipulator. The process of attachment and detachment between the master 100 and the slave 200 will be described in detail later.

Hereinafter, each component of the tool changing system according to the first embodiment of the present disclosure will be described in detail with reference to FIGS. 2 to 6.

Figure 2:
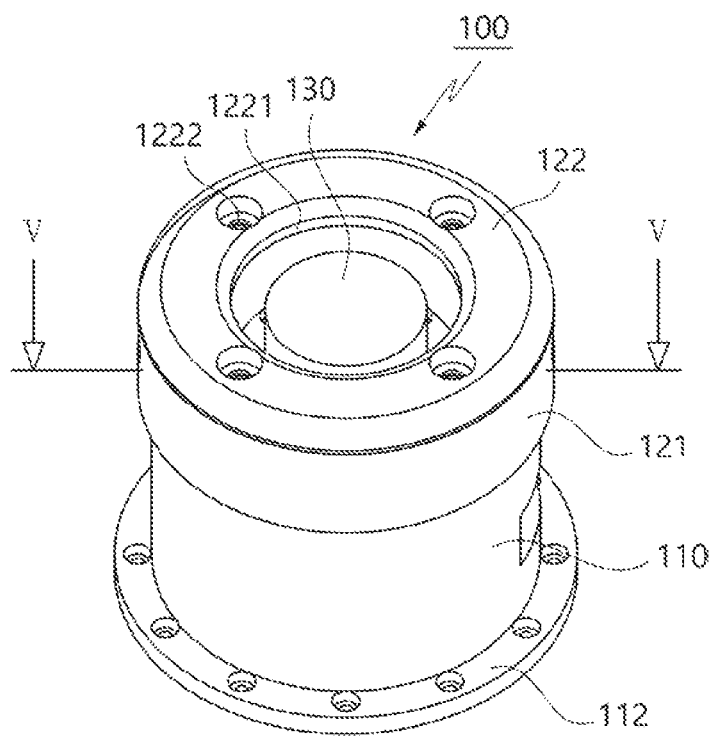
FIG. 2 is a perspective view of a master of the tool changing system of a robot manipulator according to the first embodiment of the present disclosure.

FIG. 2 is a perspective view of the master 100 of the tool changing system of a robot manipulator according to the first embodiment of the present disclosure; FIG. 3 is an exploded perspective view of the master 100 of the tool changing system of a robot manipulator according to the first embodiment of the present disclosure; and FIG. 4 is an exploded perspective view of the slave 200 of the tool changing system of a robot manipulator according to the first embodiment of the present disclosure.

As illustrated in FIGS. 2 and 3, the master 100 according to the first embodiment of the present disclosure may include an actuator 140 and a master magnet 130. Here, the master magnet 130 may be connected to the rotating shaft of the actuator 140 and may be rotated according to the rotation of the actuator 140.

Figure 4:
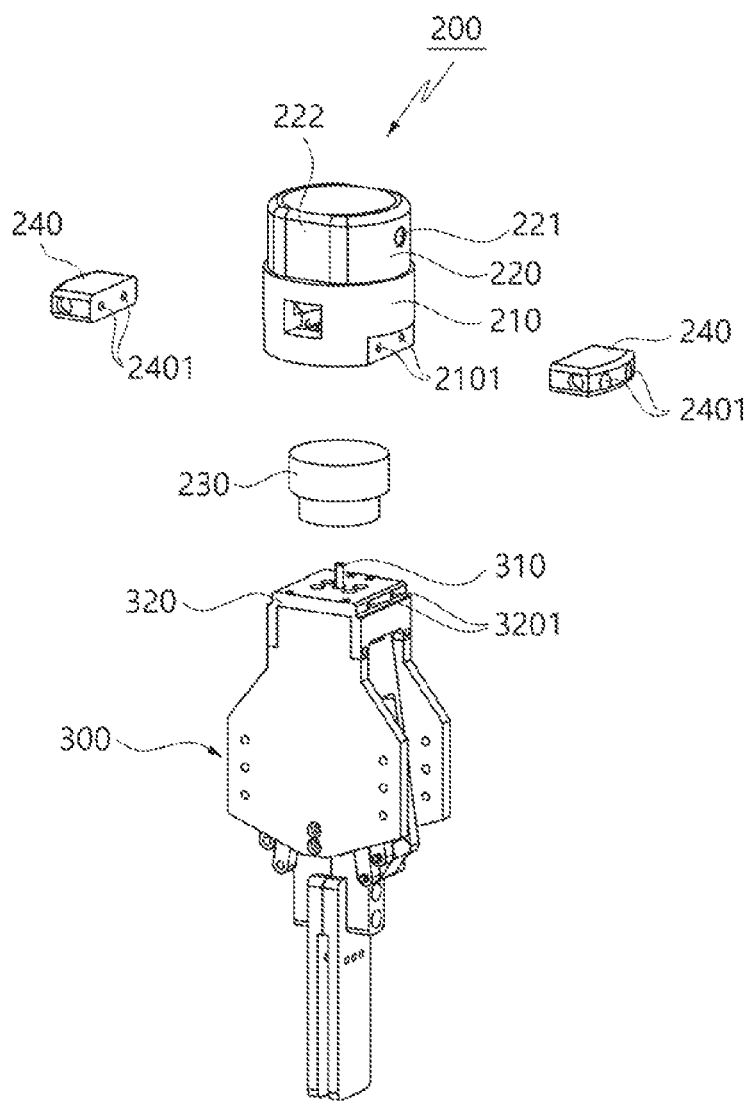
FIG. 4 is an exploded perspective view of a slave of the tool changing system of a robot manipulator according to the first embodiment of the present disclosure.

As illustrated in FIG. 4, the slave 200 may include a slave magnet 230. Here, when the master 100 and the slave 200 are coupled to each other, the slave magnet 230 may be rotated in synchronization with the rotation of the master magnet 130 by magnetism therebetween. In this case, the rotation of the slave magnet 230 produces a rotating force necessary for operating the tool 300 and the rotating force may be transmitted to the tool 300. Accordingly, the slave magnet 230 may be coupled to the rotating shaft 310 of the inside of the tool 300.

According to the configuration described above, when the actuator 140 such as a motor is installed in the master 100, the master magnet 130 and the slave magnet 230 mounted to the master 100 and the slave 200, respectively, may be rotated in synchronization with each other by the magnetism, and the rotating force of the slave magnet 230 may be transmitted to the tool 300. Accordingly, a separate actuator may not be mounted to the tool 300 or the slave 200, so in the tool changing system using multiple tools 300, the installation cost of the actuator 140 installed in each of the tools 300 can be decreased.

In addition, in a case in which the actuator 140 is mounted to the tool 300 or the slave 200, the structure of terminals applied for power supply and signal transmission during the coupling of the master 100 and the slave 200 to each other for the power supply to the corresponding actuator 140 may be removed, whereby manufacturing cost can be decreased and maintenance cost due to damage to the terminals in the process of the coupling and decoupling of the terminals can be decreased.

Meanwhile, magnetic attraction between the master magnet 130 and the slave magnet 230 may be applied to maintain the coupling of the master 100 and the slave 200 to each other. That is, the tool 300 mounted to the tool mount 400 may be coupled to the slave 200 coupled to the master 100, and the master 100 may be coupled to the end of the robot manipulator. In this case, during the coupling of the master 100 and the slave 200 to each other, the magnetic attraction between the master magnet 130 and the slave magnet 230 may be produced and may maintain the coupling of the master 100 and the slave 200 to each other.

Accordingly, to maintain the initial coupling of the master 100 and the slave 200 to each other, a pneumatic or motor method used conventionally may not be used, but the magnetic attraction between the master magnet 130 and the slave magnet 230 installed for power transmission between the master 100 and the slave 200 may be used, thereby simplifying a coupling and decoupling structure and significantly decreasing manufacturing cost.

More specifically, referring to FIGS. 2 and 3, the master 100 according to the first embodiment of the present disclosure may include a master housing 110 and the master coupling part 120.

The master housing 110 is coupled to the end of the robot manipulator. A master skirt part 112 may be provided at a first end part of the master housing 110, the master skirt part extending radially outward. The master skirt part 112 may have multiple bolt fastening holes 1121 formed therein and thus may be coupled to the end of the robot manipulator by bolts (not shown).

The master housing 110 may be formed to have a cylindrical shape, and may have the actuator 140 installed therein. Here, a wiring through hole 111 may be formed in a side surface of the master housing 110 having a cylindrical shape such that wiring (not shown) for power supply and signal transmission to the actuator 140 installed inside the master housing 110 passes through the wiring through hole 111.

The master coupling part 120 may be provided at an end of the master housing 110, that is, at a side of the slave 200, and may be coupled to a slave coupling part 220, 221, and 222 of the slave 200 to be described later. Here, the master coupling part 120 may have a cylindrical shape like the master housing 110, and may have the master magnet 130 installed rotatably inside the master coupling part 120.

As illustrated in FIG. 4, the slave 200 may include the slave coupling part 220, 221, and 222 and a slave housing 210.

As described above, the slave coupling part 220, 221, and 222 may be coupled to the master coupling part 120 such that the master 100 and the slave 200 are coupled to each other.

The slave housing 210 may be provided at the end of the slave coupling part 220, 221, and 222, that is, at a side of the tool 300 and may be coupled to the tool 300. A structure in which the tool 300 is coupled to the slave housing 210 will be described later. Here, the slave magnet 230 may be installed rotatably inside the slave housing 210.

In the tool changing system according to the present disclosure, one of the master coupling part 120 and the slave coupling part 220, 221, and 222 may be inserted into a remaining one thereof, so the master coupling part 120 and the slave coupling part 220, 221, and 222 may be coupled to each other. In the first embodiment of the present disclosure, the slave coupling part 220, 221, and 222 may be inserted into the master coupling part 120.

More specifically, referring to FIGS. 2 and 3, the master coupling part 120 may include a master coupling housing 121 and a master coupling cover 122.

The master coupling housing 121 may have an opening formed by being open to the slave 200 and have a cylindrical shape, and the master magnet 130 may be arranged inside the master coupling housing 121. Multiple bolt fastening holes 1213 may be formed in a flat surface of the master coupling housing 121 toward the master housing 110 such that the master coupling housing 121 is bolted to the master housing 110. A shaft through hole 1211 may be formed so as to connect the master magnet 130 located inside the master coupling housing 121 to the rotating shaft of the actuator 140.

The master coupling cover 122 may block the opening of the master coupling housing 121, and may have a slave through hole 1221 formed therethrough such that the master coupling cover 122 is coupled to the slave coupling part 220, 221, and 222. Here, the master coupling housing 121 and the master coupling cover 122 may be bolted to each other through a plurality of bolt fastening holes 1222 formed in the master coupling cover 122.

As illustrated in FIG. 4, the slave coupling part 220, 221, and 222 may include a slave coupling housing 220 having an opening formed therethrough, the opening being open to the master 100. Here, the slave coupling housing 220 may have an outside size allowing the slave coupling housing 220 to be inserted into the master coupling housing 121 through the slave through hole 1221. The slave coupling housing 220 may be manufactured to have a cylindrical shape having an inside size allowing the master magnet 130 to be inserted into the slave coupling housing 220 through the opening thereof when the slave coupling housing 220 is inserted into the master coupling housing 121.

Due to such a configuration, when the slave coupling housing 220 is inserted into the master coupling housing 121 through the slave through hole 1221, the slave coupling housing 220 may be inserted into space between the master magnet 130 and the inner wall surface of the master coupling housing 121 as illustrated in FIG. 2. The master coupling part 120 and the slave coupling part 220, 221, and 222 may be coupled to each other such that the master magnet 130 is located inside the slave coupling housing 220 with the slave coupling housing 220 arranged inside the master coupling housing 121.

In this case, the master magnet 130 installed inside the master coupling part 120 and the slave magnet 230 installed inside the slave housing 210 face each other with the master magnet 130 and the slave magnet 230 spaced apart from each other by a predetermined interval, whereby the coupling of the master 100 and the slave 200 to each other may be maintained. Further, the rotating force of the actuator 140 installed in the master 100 may be transmitted to the tool 300 through the master magnet 130 and the slave magnet 230.

Figure 5:
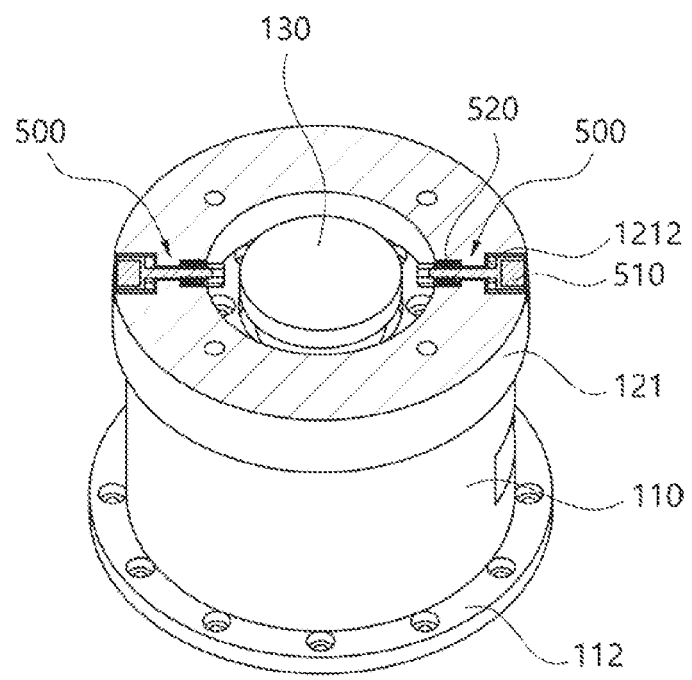
FIG. 5 is a cross-sectional view taken along line V-V of FIG. 2.

Meanwhile, as illustrated in FIG. 5, the tool changing system according to the first embodiment of the present disclosure may further include a slave removal prevention unit 500.

The slave removal prevention unit 500 may be installed in the master coupling part 120 of the master 100. Furthermore, the slave removal prevention unit 500 may prevent the removal of the slave 200 by protruding from the master coupling part 120 to the slave coupling part 220, 221, and 222 while one of the master coupling part 120 and the slave coupling part 220, 221, and 222 is inserted into a remaining one thereof.

In the first embodiment of the present disclosure, as described above, the slave coupling housing 220 may be inserted into the master coupling housing 121 through the slave through hole 1221 of the master coupling cover 122. When the slave coupling housing 220 is inserted into the master coupling housing 121, the slave removal prevention unit 500 may prevent the removal of the slave 200 by being held in the slave housing 210 by protruding in a direction of the slave housing 210.

More specifically, as illustrated in FIG. 4, the slave coupling part 220, 221, and 222 may include at least one pin fastening hole 221 formed through the outer side of the slave coupling housing 220 from the inner side of the slave coupling housing 220 in a radial direction thereof. In the embodiment illustrated in FIG. 4, the pin fastening hole 221 is illustrated to be formed at a first side of the slave coupling housing 220, but another pin fastening hole 221 may be formed at a second side opposite to the first side of the slave coupling housing 220.

Furthermore, the slave removal prevention unit 500 may prevent the removal of the slave 200 by being inserted into the pin fastening hole 221 with the slave coupling housing 220 inserted into the master coupling housing 121.

Referring to FIG. 5, the slave removal prevention unit 500 according to the first embodiment of the present disclosure may include a fastening pin 510 and an elastic member 520.

The fastening pin 510 may be installed at the inner wall surface of the master coupling housing 121 to protrude inward therefrom, and may be inserted into the pin fastening hole 221. Here, a pin receiving part 1212 in which the fastening pin 510 is received may be formed inside the master coupling housing 121.

The elastic member 520 may press the fastening pin 510 in the direction of inserting the fastening pin 510 into the pin fastening hole 221, and thus a state in which the fastening pin 510 is inserted into the pin fastening hole 221 may be maintained. In this case, when removing the slave 200 from the master 100, the fastening pin 510 may be moved outward such that the fastening pin 510 is magnetically attracted by a driving magnet 425 of the tool mount 400, which will be described with reference to FIG. 6.

Figure 6:
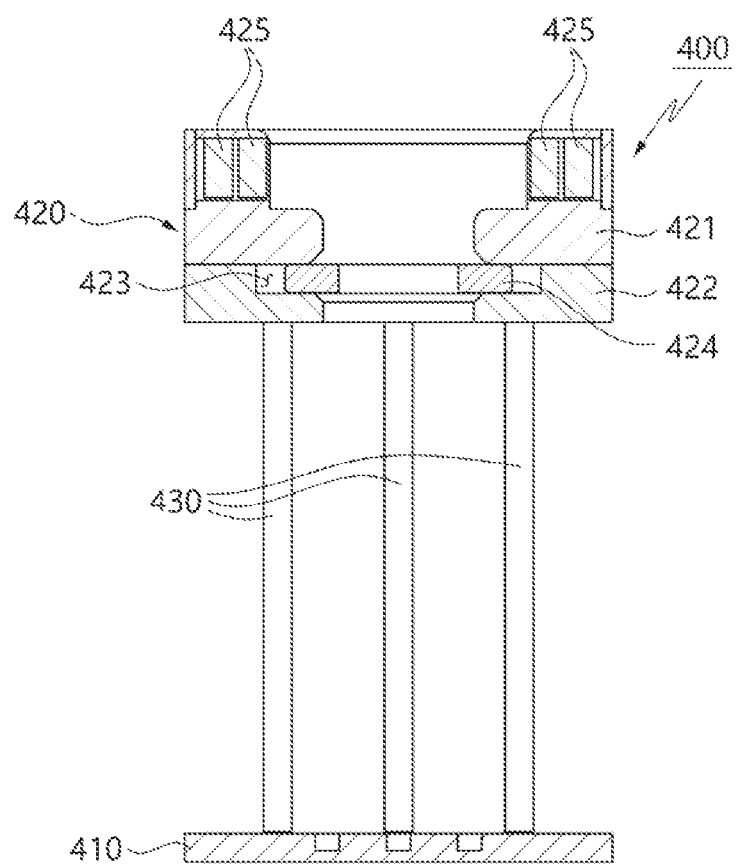
FIG. 6 is a sectional view of a tool mount of the tool changing system of a robot manipulator according to the first embodiment of the present disclosure.

FIG. 6 is a sectional view of the tool mount 400 of the tool changing system of a robot manipulator according to the first embodiment of the present disclosure. Referring to FIGS. 1 and 6, with the tool 300 coupled to the slave 200, the slave 200 may be mounted to the tool mount 400 according to the present disclosure.

In addition, as illustrated in FIG. 6, the driving magnet 425 may be installed at each of the opposite sides of the tool mount 400. Here, in the present disclosure, the fastening pin 510 may be provided at each of the opposite sides of the inner wall surface of the master coupling housing 121. The fastening pins 510 may be made of materials having polarities different from each other. For example, when the fastening pin 510 located at a first side has an N-polarity, the fastening pin 510 located at a second side may have an S-polarity. Likewise, when the driving magnet 425 located at a first side corresponding to the fastening pin 510 has an N-polarity, the driving magnet 425 located at a second side may have an S-polarity.

Accordingly, when the slave 200 is mounted to the tool mount 400 with the slave 200 coupled to the master 100, the slave 200 may be arranged such that the fastening pin 510 and the driving magnet 425 having polarities different from each other face each other. In this case, the fastening pin 510 may be pulled by the magnetism of the driving magnet 425, and may be removed from the pin fastening hole 221.

In addition, when the master 100 is coupled to the slave 200 mounted to the tool mount 400, the master 100 may be rotated such that the fastening pin 510 and the driving magnet 425 having the same polarities to each other face each other, and the fastening pin 510 may be pushed by the magnetism of the driving magnet 425, so the fastening pin 510 may be inserted into the pin fastening hole 221. In this case, the fastening pin 510 may be pressed toward the pin fastening hole 221 by the elastic force of the elastic member 520, but the arrangement of the fastening pin 510 during the mounting of the tool 300 to the tool mount and the arrangement of the fastening pin 510 during the coupling of the slave 200 coupled to the tool 300 to the master 100 to each other may be changed according to the polarity of the driving magnet 425, which will be described later.

Referring back to FIG. 4, the slave 200 may include a pair of tool mounting members 240 installed at the opposite sides of the radial direction of the slave housing 210 and protruding to the outsides of the radial direction. Furthermore, as illustrated in FIG. 6, the tool mount 400 may include a base plate 410, a tool mounting part 420, a tool mounting slit 423, and a plurality of supports 430.

Each of the tool mounting members 240 may be inserted into the tool mounting slit 423 such that the tool 300 and the slave 200 are mounted to the tool mount 400. In the present disclosure, as illustrated in FIG. 4, the tool 300 and the slave 200 may be coupled to each other by using the tool mounting members 240.

More specifically, referring to FIG. 4, a tool fastening part 320 formed at the front end of the tool 300 may have a square shape having a flat surface, and the inner surface of the opening of the slave housing 210 open to the tool 300 may be provided to have a square shape.

In addition, bolt fastening holes 3201 may be formed in each of the opposite side surfaces of the tool fastening part 320, and a bolt through hole 2101 corresponding to each of the bolt fastening holes 3201 may be formed in a side surface of the slave housing 210. Additionally, with the tool fastening part 320 inserted into the slave housing 210, a fastening bolt (not shown) may be fastened to the bolt through hole 2101 and the bolt fastening hole 3201 through the bolt fastening hole 2401 formed in each of the tool mounting members 240, so the tool 300 may be coupled to the slave 200.

Meanwhile, the tool mounting part 420 may be arranged by being spaced apart upward from the base plate 410, and the plurality of supports 430 may connect the tool mounting part 420 and the base plate 410 to each other such that the tool mounting part 420 and the base plate 410 are spaced apart from each other. As illustrated in FIG. 1, the tool mounting part 420 may have a shape of a horseshoe open at a front thereof. Furthermore, as illustrated in FIG. 6, the tool mounting slit 423 may be formed at each of the opposite inner wall surfaces of the tool mounting part 420, and the driving magnet 425 may be arranged at an inner side of each of the tool mounting slits 423.

In the present disclosure, the tool mounting part 420 may be formed by the coupling of an upper tool mounting part 421 and a lower tool mounting part 422 to each other, and when the upper tool mounting part 421 and the lower tool mounting part 422 are coupled to each other, the tool mounting slit 423 may be defined.

According to the configuration described above, in the tool changing system according to the first embodiment of the present disclosure, with the master 100 and the slave 200 coupled to each other, the process of mounting the tool 300 and the slave 200 to the tool mount 400 will be described with reference to FIGS. 7 to 10A, 10B, 10C, and 10D. Here, in FIGS. 7 to 9, the master 100 to which the slave 200 is coupled is not illustrated, but the slave may be assumed to be coupled to the master 100. It is natural that the tool 300 and the slave 200 move according to the operation of the robot manipulator. Furthermore, FIGS. 7 to 9 illustrate in a state in which the lower tool mounting part 422 is removed from the tool mounting part 420.

Figure 7:
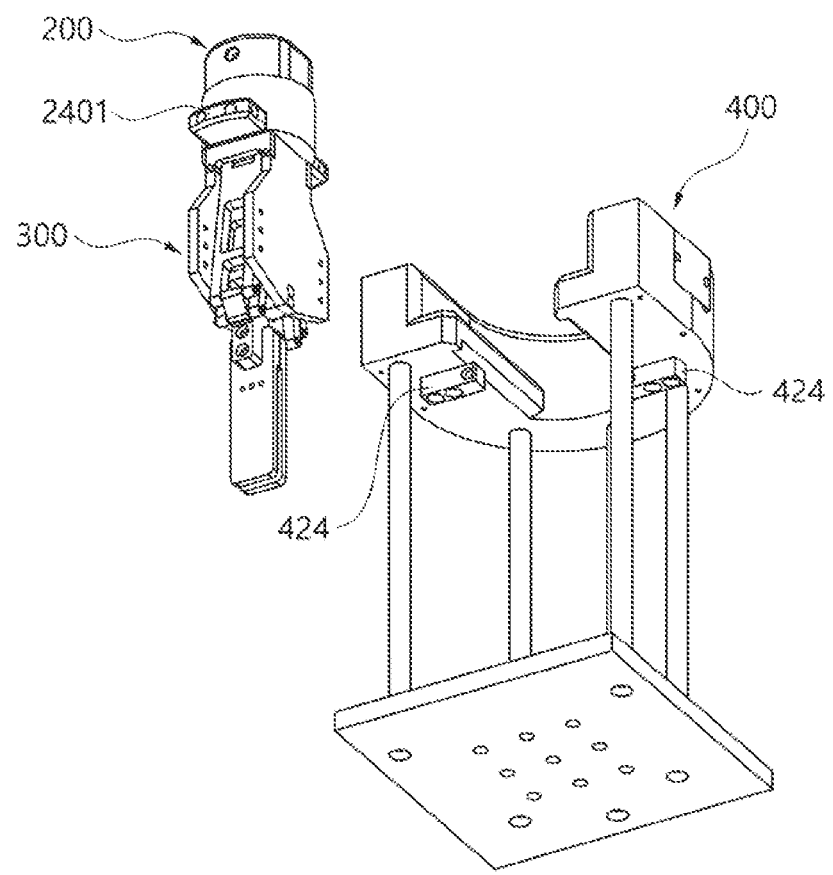

First, as illustrated in FIG. 7, the tool mounting member 240 may be introduced to the tool mounting part 420 from the front thereof with the tool mounting member 240 located in the front-to-rear direction of the tool mounting part 420. In this case, as illustrated in FIG. 10A, the state of the fastening pin 510 inserted into the pin fastening hole 221 may be maintained by the elastic member 520.

Figure 8:
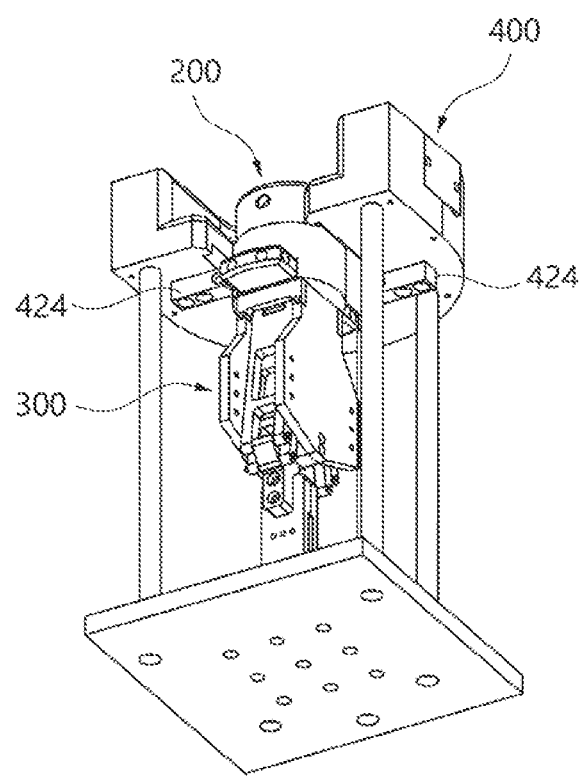
Figure 10A:
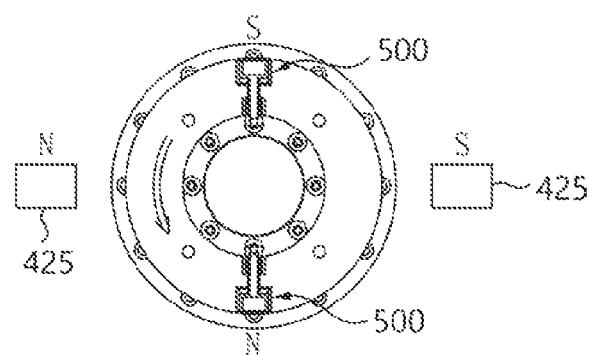

In addition, as illustrated in FIG. 8, when the slave 200 is completely mounted to the tool mounting part 420, the fastening pin 510 and the driving magnet 425 may be arranged to be orthogonal to each other as illustrated in FIG. 10A.

Figure 9:
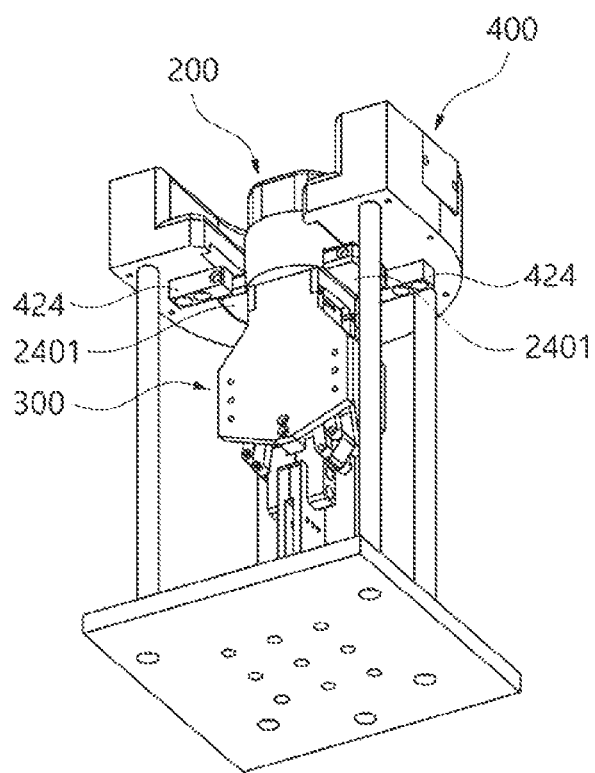

Next, as illustrated in FIG. 9, when the robot manipulator rotates the master 100 and the slave 200, the tool mounting member 240 may be inserted into the tool mounting slit 423, so the tool 300 and the slave 200 may be mounted to the tool mount 400.

Figure 10B:
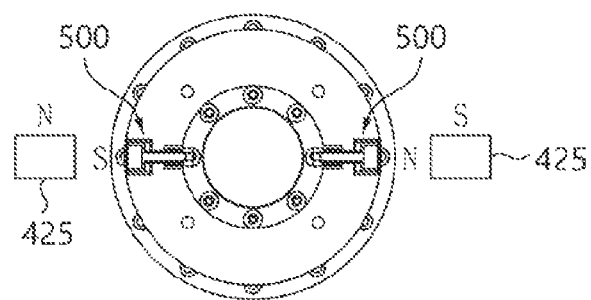

In this case, as illustrated in FIG. 10B, the master 100 and the slave 200 are rotated such that the fastening pin 510 and the driving magnet 425 having polarities different from each other face each other. Due to the different polarities, the fastening pin 510 may be pulled by the driving magnet 425, and may be removed from the pin fastening hole 221.

In addition, when the robot manipulator raises the master 100 by power overcoming magnetism between the master magnet 130 and the slave magnet 230, the coupling of the master 100 and the slave 200 may be released.

Here, in the first embodiment of the present disclosure, the tool mounting slit 423 may have a pair of holding jaws 424 installed therein such that when the master 100 and the slave 200 rotate, the tool mounting member 240 may be held in each of the holding jaws 424 at a predetermined mounting position.

In this case, the fastening pin 510 and the driving magnet 425 may face each other at the mounting position, whereby the fastening pin 510 inserted into the pin fastening hole 221 may be located at a more precise position.

Figure 10C:
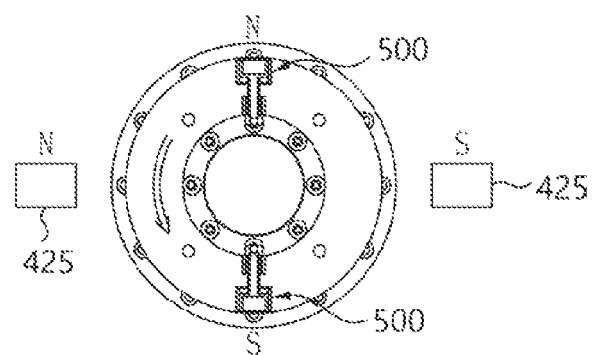

On the other hand, when the master 100 and the slave 200 are coupled to each other with the tool 300 mounted to the tool mounting part 420, the slave coupling part 220, 221, and 222 and the master coupling part 120 may be coupled to each other in a direction illustrated in FIG. 10C. In this case, the slave coupling part 220, 221, and 222 and the master coupling part 120 may be coupled to each other in a state in which the fastening pin 510 is not held by a cut surface 222 formed on the slave coupling housing 220 although the fastening pin 510 is protruded to the slave coupling housing 220 by the elastic member 520.

Figure 10D:
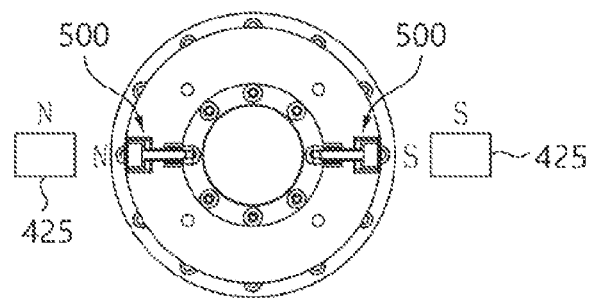
Figure 11:
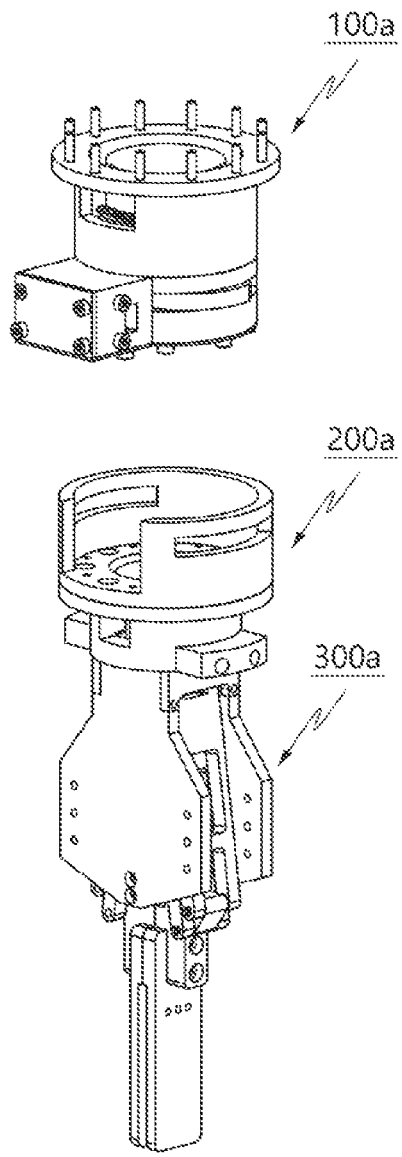
FIG. 11 is a perspective view of the tool changing system of a robot manipulator according to a second embodiment of the present disclosure.

Next, the master 100 may be rotated in a direction illustrated in FIG. 10D. In this case, the master 100 and the slave 200 may not be completely coupled to each other. As described above, the tool mounting member 240 may be held in the holding jaw 424, and thus when the master 100 is rotated counterclockwise in a state of the master 100 illustrated in FIG. 10C, only the master may be rotated.

In a state illustrated in FIG. 10D, the fastening pin 510 and the driving magnet 425 having the same polarities to each other may face each other, and the fastening pin 510 may be pushed by the magnetism of the driving magnet 425, so the fastening pin 510 may be inserted into the pin fastening hole 221. In this case, the elastic force of the elastic member 520 may also be applied to the fastening pin 510.

Next, in the state of the slave 200 and the master 100 illustrated in FIG. 10D, when the slave 200 and the master 100 are moved to the front of the tool mount 400 after being rotated clockwise, the slave 200 and the master 100 may be removed from the tool mount 400 with the slave 200 and the master 100 coupled to each other.

Second Embodiment

Hereinafter, the tool changing system according to the first embodiment of the present disclosure will be described with reference to FIGS. 11 to 15. Here, in describing the second embodiment of the present disclosure, components of the second embodiment corresponding to the components of the first embodiment may use the same names, and detailed descriptions thereof may be replaced with descriptions of the corresponding components of the first embodiment.

As in the first embodiment, the tool changing system according to the second embodiment of the present disclosure may include the master 100a and the slave 200a.

The master 100a may include an actuator 140a and a master magnet 130a, and the slave 200a may include a slave magnet 230a, the slave magnet 230a being rotated in synchronization with the rotation of the master magnet 130a by the magnetism during the coupling of the slave 200a to the master 100a. Accordingly, the same effect as in the first embodiment may be provided.

Figure 12:
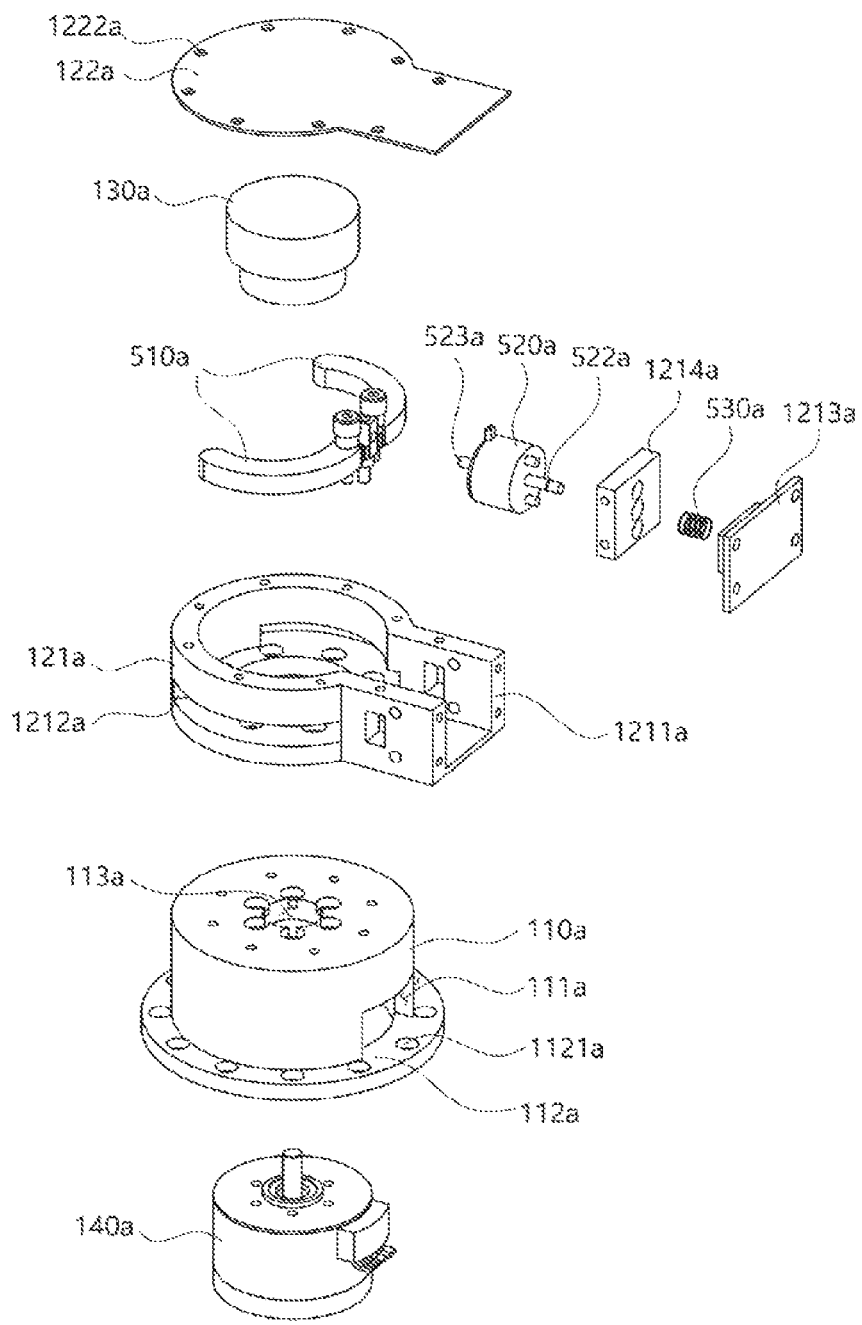
FIG. 12 is an exploded perspective view of a master of the tool changing system of a robot manipulator according to the second embodiment of the present disclosure.

As illustrated in FIG. 12, the master 100a may include: a master housing 110a having the actuator 140a installed therein and coupled to the end of the robot manipulator; and a master coupling part 120a provided at the end of the master housing 110a and coupled to the slave 200a, the master coupling part 120a having the master magnet 130a installed rotatably therein. Here, as in the first embodiment, a master skirt part 112a, multiple bolt fastening holes 1121a, a wiring through hole 111a, and the shaft through hole 114a may be formed in the master housing 110a.

The master coupling part 120a may be provided at the end of the master housing 110a, that is, at a side directed to the slave 200a, and may be coupled to a slave coupling part 220a, 221a, and 222a of the slave 200a to be described later. Here, the master magnet 130a may be installed rotatably inside the master coupling part 120a.

Figure 14:
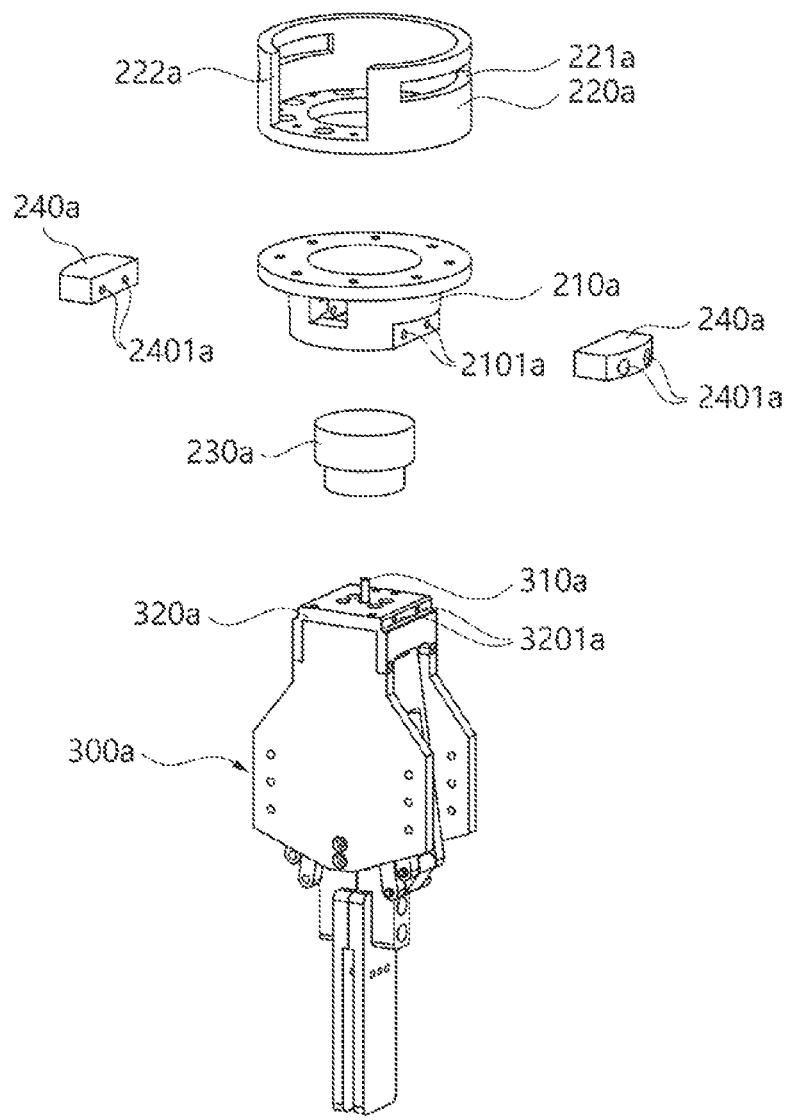
FIG. 14 is an exploded perspective view of a slave of the tool changing system of a robot manipulator according to the second embodiment of the present disclosure.

As illustrated in FIG. 14, the slave 200a may include the slave coupling part 220a, 221a, and 222a and a slave housing 210a. The slave coupling part 220a, 221a, and 222a may be coupled to the master coupling part 120a, and the slave housing 210a may be provided on the end of the slave coupling part and be coupled to the tool 300a. Here, the slave magnet 230a may be installed rotatably inside the slave coupling part 220a, 221a, and 222a.

Here, in the second embodiment of the present disclosure, the master coupling part 120a may be inserted into the slave coupling part 220a, 221a, and 222a, and thus the master 100a and the slave 200a may be coupled to each other. Through such a coupling, the master magnet 130a and the slave magnet 230a may face each other while being spaced apart from each other by a predetermined interval, whereby the coupling of the master 100a and the slave 200a to each other may be maintained, and further, the rotating force of the master 100a may be transmitted to the slave 200a and may allow the tool 300a to be driven.

More specifically, referring to FIGS. 12 and 14, the master coupling part 120a may include a master coupling housing 121a and a master coupling cover 122a. Furthermore, the slave coupling part 220a, 221a, and 222a may include a slave coupling housing 220a.

The master coupling housing 121a may have an opening formed by being open to the slave 200a, and may have the master magnet 130a rotatably arranged inside the master coupling housing 121a. Furthermore, the master coupling cover 122a may block the opening of the master coupling housing 121a. Unlike the first embodiment, the master coupling part 120a may be configured to be inserted into the slave coupling part 220a, 221a, and 222a, but a slave through hole 1221a may not be required to be formed in the master coupling cover 122a according to the second embodiment. Here, the master coupling cover 122a may have a plurality of bolt fastening holes formed therein and may be bolted to the master coupling housing 121a.

The slave coupling housing 220a may have an opening formed therein such that the master coupling housing 121a is inserted into the slave coupling housing 220a. Here, a driving box 1211a in which a latch driving part of a slave removal prevention unit 500a to be described later is installed may be formed on the master coupling housing 121a by protruding from a side of the master coupling housing 121a. The slave coupling housing 220a may have a box insertion area 222a cut at a side surface of the slave coupling housing 220a such that the driving box 1211a is inserted into the box insertion area 222a when the master coupling housing 121a is inserted into the slave coupling housing 220a. Accordingly, when the master 100a and the slave are coupled to each other, a direction of the alignment of the master 100a and the slave 200a with each other may be determined, and after the coupling of the master 100a and the slave 200a to each other, the movements of the master 100a and the slave 200a in rotating directions thereof may be prevented.

Figure 13:
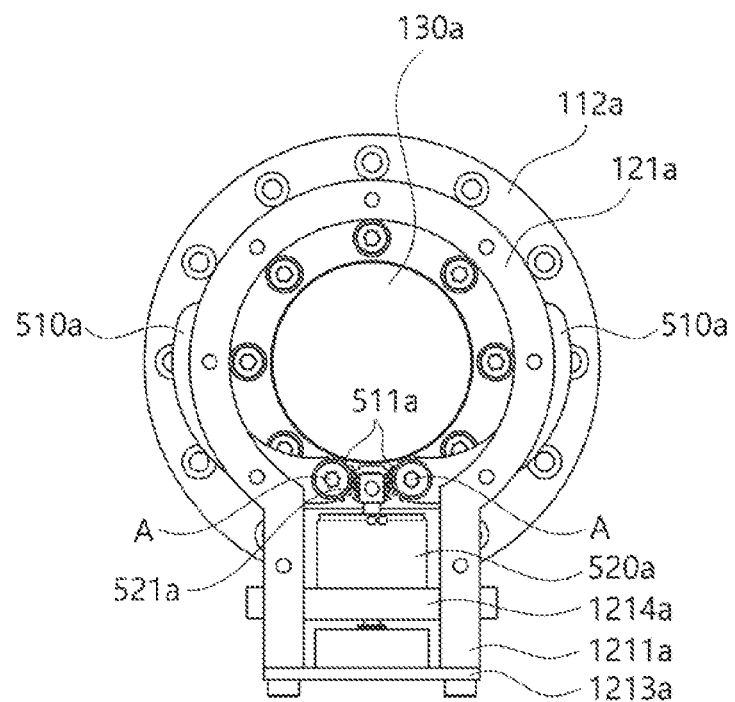
FIG. 13 is a view illustrating the structure of a slave removal prevention unit of the tool changing system of a robot manipulator according to the second embodiment of the present disclosure.

Meanwhile, as illustrated in FIG. 13, the slave removal prevention unit 500a according to the second embodiment of the present disclosure may include a pair of latch members 510a and the latch driving part.

A pair of master slits 1212a may be formed radially outward through the master coupling housing 121a. Likewise, a slave slit 221a may be formed through the slave coupling housing 220a, wherein the slave slit 221a may be located at a position corresponding to each of the master slits 1212a when the master coupling housing 121a is inserted into the slave coupling housing 220a.

Here, each of the latch members 510a may be mounted to the master coupling housing 121a such that the latch member 510a is rotated between an insertion position at which the latch member 510a is inserted into the slave slit 221a through the master slit 1212a and a removal position at which the latch member 510a is removed from the slave slit 221a through the master slit 1212a. Here, a side of the latch member may be mounted to the master coupling housing 121a by a hinge shaft A.

In addition, the latch driving part may rotate the latch member 510a between the insertion position and the removal position. Here, as described above, the latch driving part may be installed in the driving box 1211a formed on a side surface of the master coupling housing 121a.

In the present disclosure, the latch driving part may include a solenoid 520a and an elastic spring 530a. The solenoid 520a may be coupled to a solenoid block 1214a through a screw (not shown), and the solenoid block 1214a may be coupled to the inside of the driving box 1211a through a screw (not shown). A snap ring 522a may be fitted to a groove formed in a shaft of the solenoid 520a, and the elastic spring 530a may be located between the snap ring 522a and a spring cover 1213a, so the elastic spring 530 may press the solenoid shaft 523a to which the snap ring 522a is fitted forward, that is, in a direction toward the latch member 510a. Here, the spring cover 1213a may be coupled to the driving box 1211a through a screw (not shown), and may block a side surface of the driving box 1211a.

In addition, a rack gear 511a may be formed at an end of the latch member 510a adjacent to the solenoid shaft 523a, and a pinion gear 521a engaged with the rack gear 511a may be formed at an area adjacent to the hinge shaft A of the latch member 510a.

According to the above configuration, in a state in which the solenoid 520a does not operate, the elastic spring 530a may push the solenoid 520a in a direction toward the latch member 510a, and a state in which the latch member 510a is moved to the insertion position may be maintained by the pinion gear 521a formed at the end of the solenoid shaft 523a and engaged with the rack gear 511a.

In addition, during the initial coupling or decoupling of the master 100a and the slave 200a from each other, the solenoid shaft 523a may be operated to move rearward by operating the solenoid 520a, and the latch member 510a may be rotated to the removal position, so the master 100a and the slave 200a may be coupled to each other or may be decoupled from each other.

Meanwhile, a tool mount 400a according to the second embodiment of the present disclosure may include a base plate 410a, a tool mounting part 420a, a step part 421a, and a plurality of supports 430a.

The base plate 410a may be a component through which the tool mount 400a sits on a floor, and may be manufactured to have a shape approximate to a shape of a rectangular plate. The tool mounting part 420a may be arranged by being spaced apart upward from the base plate 410a, and the plurality of supports 430a may connect the tool mounting part 420a and the base plate 410a to each other such that the tool mounting part 420a and the base plate 410a are spaced apart from each other.

Here, as in the first embodiment, the tool mounting part 420a of the second embodiment may have a shape of a horseshoe open at a front thereof. In addition, the step part 421a may be formed to be stepped at each of the inner opposite sides of the tool mounting part 420a.

Figure 15:
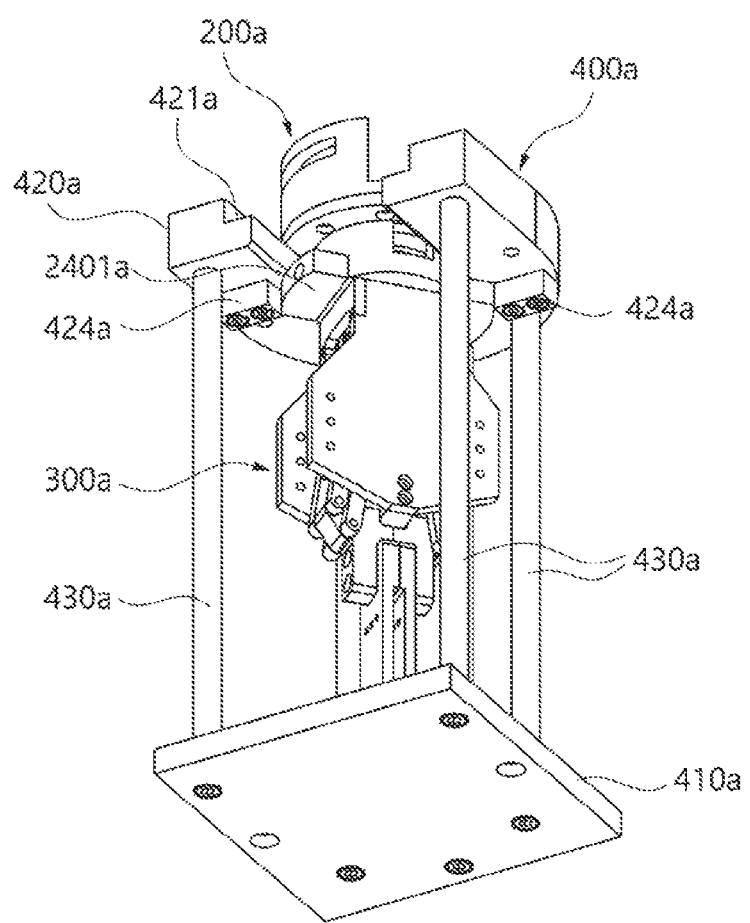
FIG. 15 is a view illustrating a tool mount of the tool changing system of a robot manipulator according to the second embodiment of the present disclosure.

According to the above configuration, as illustrated in FIG. 15, when the slave 200a is mounted to the tool mounting part 420a, the bottom surface of the slave coupling part 220a, 221a, and 222a directed to the tool 300a may sit on the step part 421a, and with a tool mounting member 240a formed at each of the opposite sides of the slave housing 210a located on the lower surface of the tool mounting part 420a, the tool 300a may be mounted to the tool mount 400a, whereby the master 100a and the slave 200a may be coupled to each other and may be decoupled from each other in the tool mounting part 420a.

That is, when the master 100a and the slave 200a rotate after the tool mounting member 240a is introduced to the tool mounting part 420a from the front thereof with the tool mounting member 240a located in a front-to-rear direction of the tool mounting part 420a, the tool mounting member 240a may be located on the lower surface of the tool mounting part 420a, so the master 100a and the slave 200a may be decoupled from each other.

Here, as in the first embodiment, a holding jaw 424a may be formed on the lower surface of the tool mounting part 420a such that the tool mounting member 240a is held in the holding jaw 424a at a preset mounting position during the rotations of the master 100a and the slave 200a.

Third Embodiment

Hereinafter, the tool changing system according to the third embodiment of the present disclosure will be described with reference to FIGS. 16 to 18. Here, the tool changing system according to the third embodiment of the present disclosure is a modified example of the tool changing system of the second embodiment.

The tool changing system according to the third embodiment of the present disclosure may include the master 100b and the slave 200b.

The master 100b may include the actuator 140b and a master magnet 130b, and the slave 200b may include a slave magnet 230b rotated in synchronization with the rotation of the master magnet 130b by the magnetism between the master magnet and the slave magnet when the slave 200b and the master 100b are coupled to each other. Accordingly, the third embodiment may provide the same effect as the first embodiment and the second embodiment.

Figure 16:
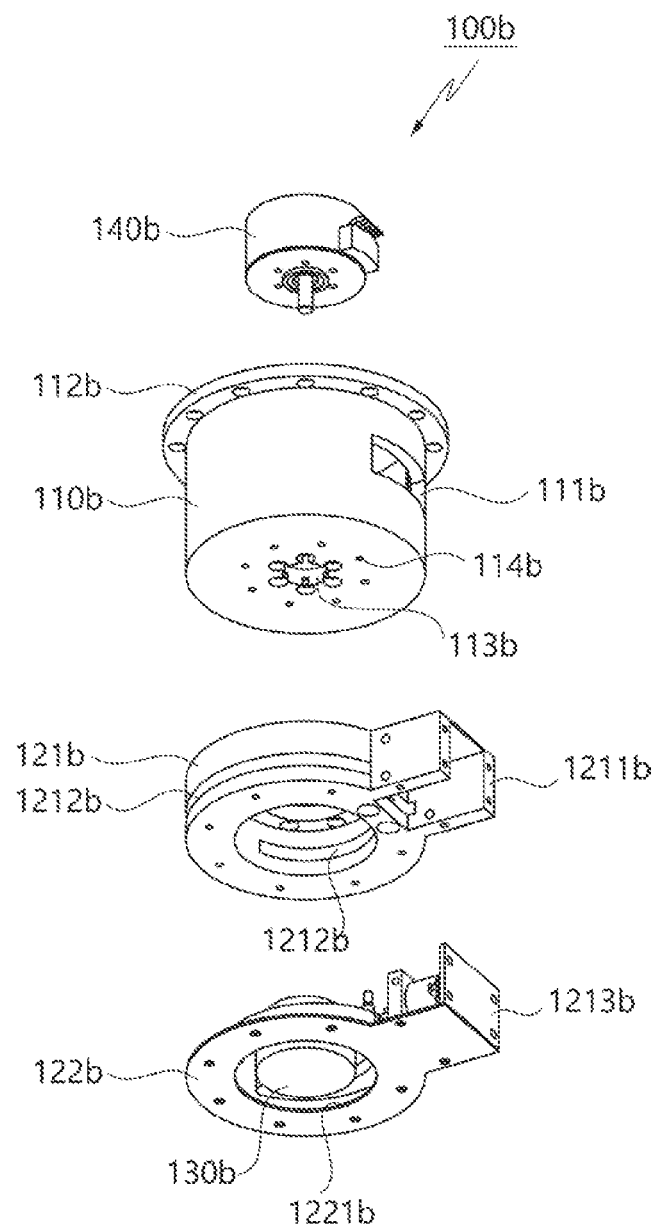
FIG. 16 is an exploded perspective view of a master of the tool changing system of a robot manipulator according to the third embodiment of the present disclosure.

As illustrated in FIG. 16, the master 100b may include: a master housing 110b having the actuator 140b installed therein and coupled to the end of the robot manipulator; and a master coupling part 120b provided at the end of the master housing 110b and coupled to the slave 200b, the master coupling part 120b having the master magnet 130b installed rotatably therein. Here, as in the second embodiment, a master skirt part 112b, multiple bolt fastening holes 1121b, and the wiring through hole 111b may be formed in the master housing 110b.

The master coupling part 120b may be provided at the end of the master housing 110b, that is, at a side toward the slave 200b, and may be coupled to a slave coupling part 220b and 221b of the slave 200b to be described later. Here, the master magnet 130b may be installed rotatably inside the master coupling part 120b.

Figure 18:
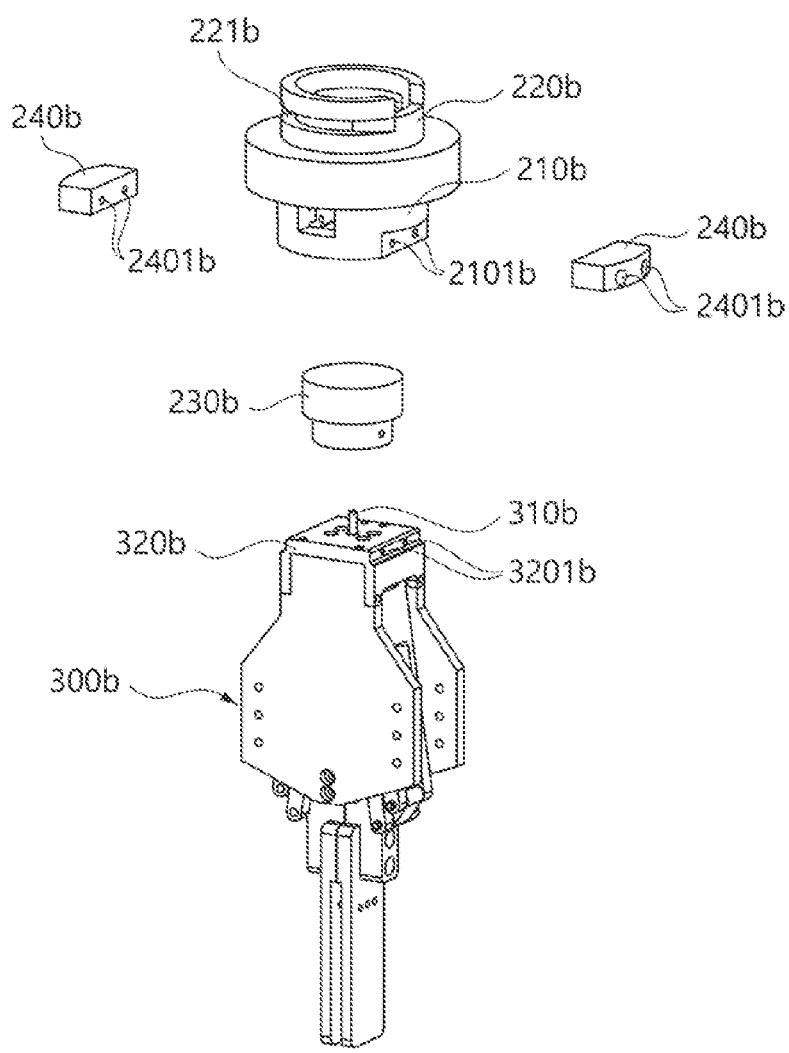
FIG. 18 is an exploded perspective view of a slave of the tool changing system of a robot manipulator according to the third embodiment of the present disclosure.

As illustrated in FIG. 18, the slave 200b may include the slave coupling part 220b and 221b and a slave housing 210b. The slave coupling part 220b and 221b may be coupled to the master coupling part 120b, and the slave housing 210b may be provided at the end of the slave coupling part and be coupled to the tool 300b. Here, the slave magnet 230b may be installed rotatably inside the slave coupling part 220b and 221b.

Here, in the third embodiment of the present disclosure, the slave coupling part 220b and 221b may be inserted into the master coupling part 120b, so the master 100b and the slave 200b may be coupled to each other. Through such a coupling, the master magnet 130b and the slave magnet 230b may face each other while being spaced apart from each other by a predetermined interval, whereby the coupling of the master 100b and the slave 200b to each other may be maintained, and further, the rotating force of the master 100b may be transmitted to the slave 200b and may allow the tool 300b to be driven.

More specifically, referring to FIGS. 16 and 18, the master coupling part 120b may include a master coupling housing 121b and a master coupling cover 122b. Furthermore, the slave coupling part 220b and 221b may include a slave coupling housing 220b.

The master coupling housing 121b may have an opening formed by being open to the slave 200b and may have the master magnet 130b rotatably arranged inside the master coupling housing 121b. Furthermore, the master coupling cover 122b may block the opening of the master coupling housing 121b. Unlike the second embodiment, the slave coupling part 220b and 221b may have a structure inserted into the master coupling part 120b. A slave through hole 1221b may be formed through the master coupling cover 122b according to the third embodiment. A plurality of bolt fastening holes may be formed in the master coupling cover 122b, and the master coupling cover 122b may be bolted to the master coupling housing 121b. Here, a driving box 1211b may be formed on the master coupling housing 121b by protruding from a side surface thereof, wherein the latch driving part of a slave removal prevention unit 500b to be described later is installed in the driving box 1211b.

In the same way as the first embodiment, the slave coupling housing 220b may have an outside size allowing the slave coupling housing 220b to be inserted into the master coupling housing 121b through the slave through hole 1221b. The slave coupling housing 220b may be manufactured to have a cylindrical shape having an inside size allowing the master magnet 130b to be inserted into the slave coupling housing 220b through the opening thereof when the slave coupling housing 220b is inserted into the master coupling housing 121b.

Figure 17:
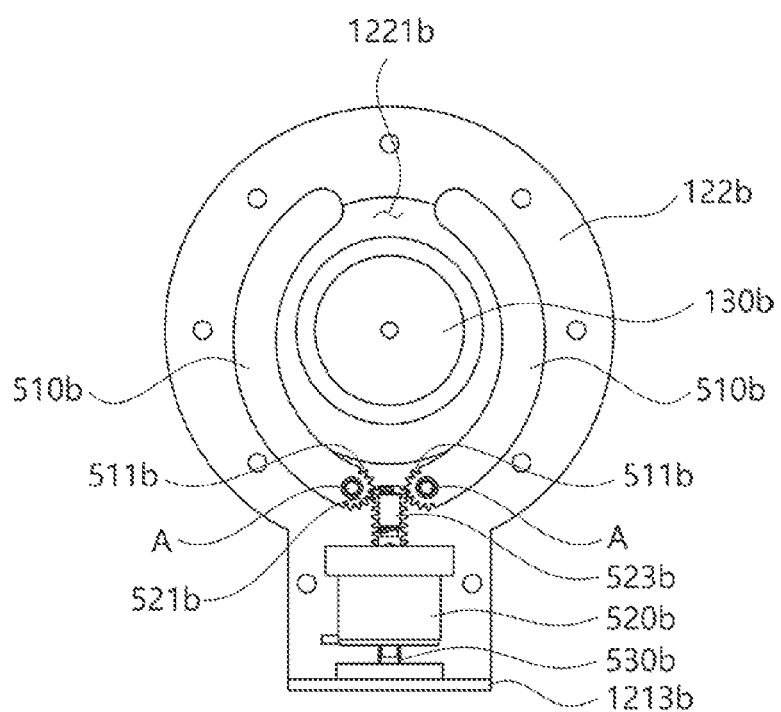
FIG. 17 is a view illustrating the structure of a slave removal prevention unit of the tool changing system of a robot manipulator according to the third embodiment of the present disclosure.

According to the configuration described above, when the slave coupling housing 220b is inserted into the master coupling housing 121b through the slave through hole 1221b, the slave coupling housing 220b is inserted into space between the master magnet 130b and the inner wall surface of the master coupling housing 121b illustrated in FIG. 17. In a state in which the slave coupling housing 220b is disposed inside the master coupling housing 121b, the master coupling part 120b and the slave coupling part 220b and 221b may be coupled to each other such that the master magnet 130b is located inside the slave coupling housing 220b.

Meanwhile, as illustrated in FIG. 17, the slave removal prevention unit 500b according to the third embodiment of the present disclosure may include a pair of latch members 510b and the latch driving part.

A pair of master slits 1212b may be formed radially outward through the master coupling housing 121b. Likewise, a slave slit 221b may be formed through the slave coupling housing 220b, wherein the slave slit 221b may be located at a position corresponding to each of the master slits 1212b when the slave coupling housing 220b is inserted into the master coupling housing 121b.

Here, each of the latch members 510b may be mounted to the master coupling housing 121b such that the latch member 510b is rotated between an insertion position at which the latch member 510b is inserted into the slave slit 221b through the master slit 1212b and a removal position at which the latch member 510b is removed from the slave slit 221b through the master slit 1212b. Here, a side of the latch member 510b may be mounted to the master coupling housing 121b by a hinge shaft B. Unlike the second embodiment, the slave slit 221b may be located at the inner side of the master slit 1212b, and an inwardly rotating position of the latch member 510b may be the insertion position, and an outwardly rotating position of the latch member 510b may be the removal position.

In addition, the latch driving part may rotate the latch member 510b between the insertion position and the removal position. Here, as described above, the latch driving part may be installed in the driving box 1211b formed on a side surface of the master coupling housing 121b.

In the present disclosure, the latch driving part may include a solenoid 520b and an elastic spring 530b. In the third embodiment, a solenoid block 1214b may not be installed, and the elastic spring 530b may be installed between a spring blocking plate 1213b and the solenoid 520b, so the elastic force of the elastic spring 530b may be supplied in a direction of pulling the solenoid 520b toward the spring blocking plate 1213b. In this case, the position of the elastic spring 530b may be arranged between the solenoid 520b and the latch member 510b, and the elastic force of the elastic spring 530b may be supplied such that the elastic spring 530b pushes the solenoid 520b toward the spring blocking plate 1213b through a separate block.

In addition, a rack gear 511b may be formed at an end of the latch member 510b adjacent to a solenoid shaft 523b, and a pinion gear 521b engaged with the rack gear 511b may be formed at an area adjacent to the hinge shaft B of the latch member 510b.

According to the above configuration, in a state in which the solenoid 520b does not operate, the elastic spring 530b may pull the solenoid 520b in a direction opposite to the latch member 510b, and a state in which the latch member 510b is moved to the insertion position may be maintained by the pinion gear 521b formed at the end of the solenoid shaft 523b and engaged with the rack gear 511b.

In addition, during the initial coupling or decoupling of the master 100b and the slave 200b from each other, the solenoid shaft 523b may be operated to move forward by operating the solenoid 520b, and the latch member 510b may be rotated to the removal position, so the master 100b and the slave 200b may be coupled to each other or may be decoupled from each other.

Meanwhile, a tool mount 400b according to the third embodiment of the present disclosure may be provided as a structure corresponding to the tool mount according to the second embodiment.

Fourth Embodiment

Figure 19:
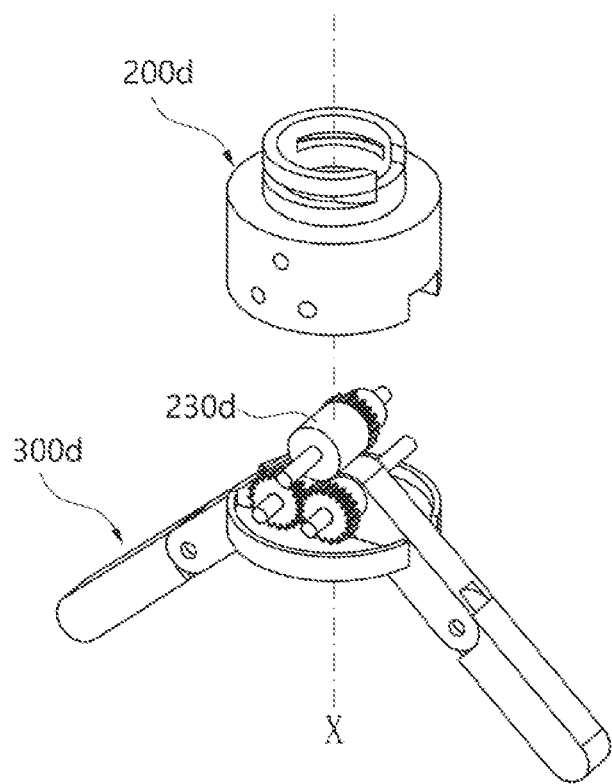
FIG. 19 is an exploded perspective view of a slave of the tool changing system of a robot manipulator according to a fourth embodiment of the present disclosure.

FIG. 19 is an exploded perspective view of a slave 200d and a tool 300d of the tool changing system according to a fourth embodiment of the present disclosure.

Figure 20A:
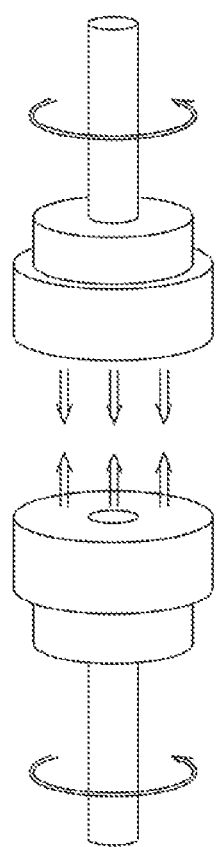
FIGS. 20A and 20B are is views illustrating connection relation between a master magnet and a slave magnet in the tool changing system of a robot manipulator according to the present disclosure.

Here, in the tool changing system according to the fourth embodiment of the present disclosure, the rotating shaft of a slave magnet 230d may be configured to be orthogonal to the rotating shaft of a master magnet (not shown). In the first embodiment to the third embodiment, the magnetic coupling through which the rotating shaft of the master magnet 130, 130a, or 130b and the rotating shaft of the slave magnet 230, 230a, or 230b are on the same axis or on parallel axes may be provided. The magnetic coupling is illustrated in FIG. 20A.

Figure 20B:
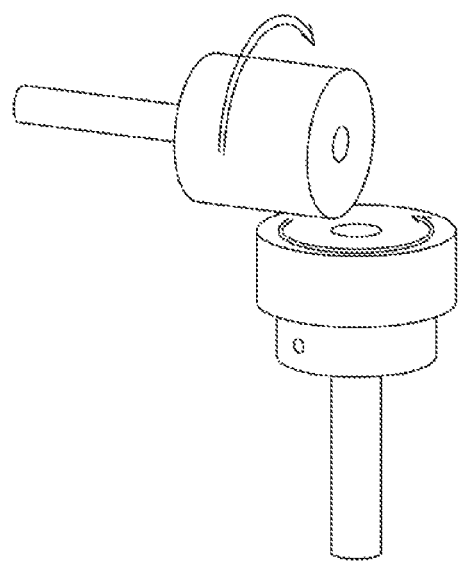

On the other hand, in the fourth embodiment of the present disclosure, a shape of a magnet gear in which the rotating shafts of the slave magnet 230d and the master magnet (the master) cross each other may be provided. The principle of the magnet gear is illustrated in FIG. 20B.

As described above, according to the structure or operation of the tool 300d mounted, the magnets may be manufactured to have the shape of the magnet gear or the magnetic coupling, and may be applied to the structures of various tools 300d.

Fifth Embodiment

Figure 21:
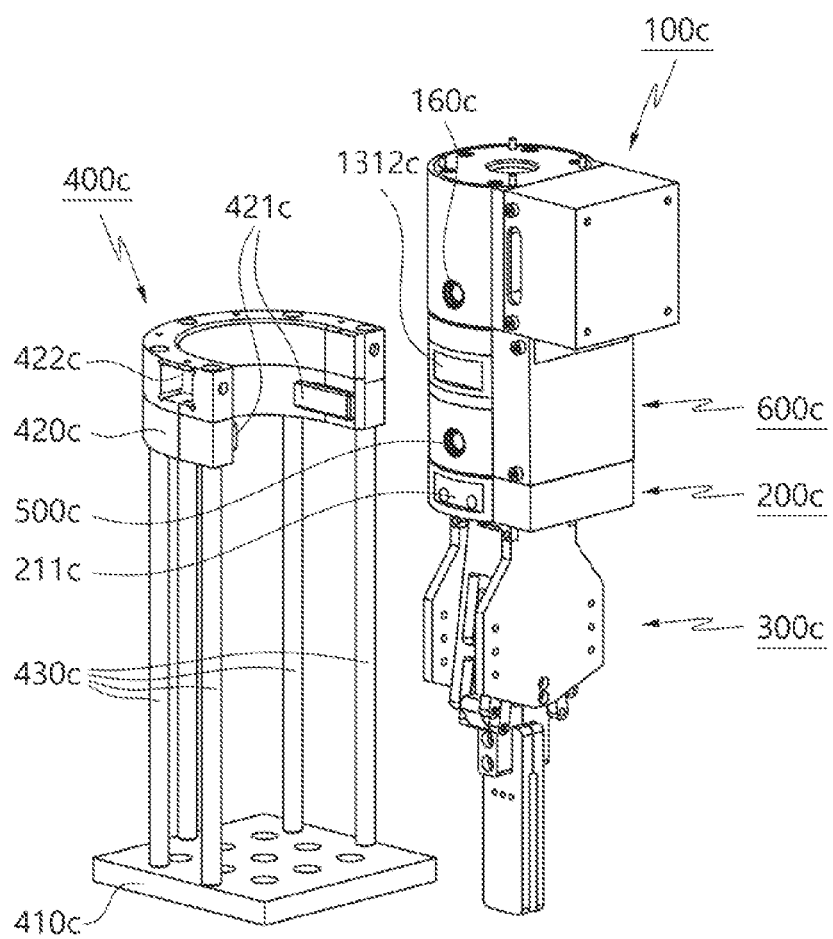
FIGS. 21 and 22 are perspective views of the tool changing system of a robot manipulator according to a fifth embodiment of the present disclosure.
Figure 22:
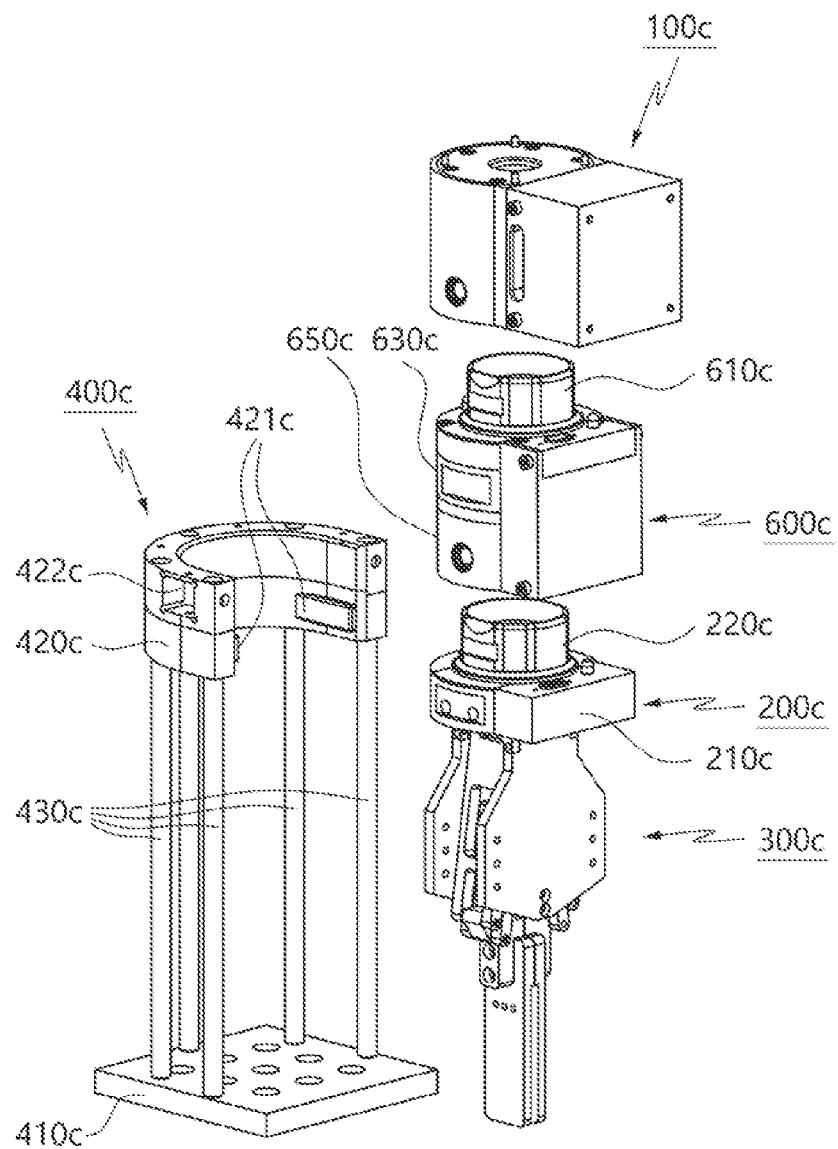

FIGS. 21 and 22 are perspective views of the tool changing system of a robot manipulator according to the fifth embodiment of the present disclosure.

Referring to FIGS. 21 and 22, the tool changing system according to the fifth embodiment of the present disclosure may include the master 100c, a slave 200c, and a reducer 600c. FIG. 21 is a view illustrating the coupled state of the master 100c, the slave 200c, and the reducer 600c to each other, and FIG. 22 is a view illustrating the decoupled state of the master 100c, the slave 200c, and the reducer 600c from each other. In addition, as illustrated in FIGS. 21 and 22, the tool changing system according to the fifth embodiment of the present disclosure may be configured by further including a tool mount 400c.

The master 100c may be coupled to the robot manipulator at a first side thereof. Furthermore, the master 100c may have a master coupling part formed at a second side thereof.

As illustrated in FIGS. 21 and 22, the slave 200c may be coupled to a tool 300c at a first side thereof and have a slave coupling part 220c formed at a second side thereof. FIGS. 21 and 22 illustrate the tool 300c having the shape of a gripper is mounted to a side of the slave 200c, but the technical spirit of the present disclosure is not limited thereto.

The reducer 600c according to the fifth embodiment of the present disclosure may include a reduction input part 610c, a reduction part 630c, and the reduction output part 650c.

The reduction input part 610c may be coupled to the master coupling part, and the reduction output part 650c may be coupled to the slave coupling part 220c. In addition, the reduction part 630c may reduce torque which is a rotating force transmitted from the master 100c through the reduction input part 610c by a predetermined reduction ratio and may transmit the reduced torque to the reduction output part 650c. Additionally, the reduction output part 650c may transmit the torque reduced by the reduction part 630c to the slave 200c. Accordingly, the reduction output part 650c may reduce the torque transmitted from the master 100c and may transmit the reduced torque to the slave 200c.

In the fifth embodiment of the present disclosure, the torque transmission between the master coupling part and the reduction input part 610c, and the torque transmission between the reduction output part 650c and the slave coupling part 220c may be performed by magnetism through magnetic coupling.

Figure 24:
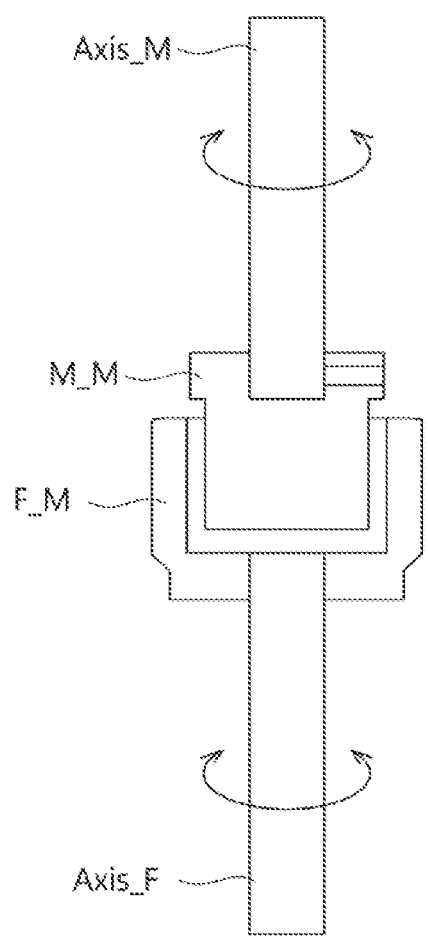

FIGS. 23 and 24 are views illustrating the principle of the transmission of a rotating force by magnetism through magnetic coupling in the tool changing system according to the fifth embodiment of the present disclosure. Referring to FIG. 23, the magnetic coupling may be performed by a female magnet member F_M and a male magnet member M_M.

The female magnet member F_M may have a cylindrical shape. Furthermore, a first side of the female magnet member F_M may have a shape open to the male magnet member M_M, and a second side of the female magnet member F_M may be coupled to a rotating shaft (Axis_F), so the rotating shaft may be rotated according to the rotation of the female magnet member F_M.

In addition, the male magnet member M_M may have a cylindrical shape capable of being inserted into the female magnet member F_M. Additionally, a second side of the male magnet member M_M may be coupled to a rotating shaft Axis M.

Accordingly, as illustrated in FIG. 24, the male magnet member M_M may be inserted into the female magnet member F_M to form the magnetic coupling. Accordingly, when one of the female magnet member F_M and the male magnet member M_M rotates, torque of the one magnet member may be transmitted to a remaining one by the magnetism through the magnetic coupling to rotate the remaining one. Accordingly, the torque of a first side may be transmitted to a second side.

As illustrated in FIG. 23, in the present disclosure, each of the female magnet member F_M and the male magnet member M_M may have an N-pole magnet and an S-pole magnet alternately formed along a circumferential direction thereof.

In addition, the magnetic attraction may occur between the female magnet member F_M and the male magnet member M_M, and the coupling of the female magnet member F_M and the male magnet member M_M to each other may be maintained by such magnetic attraction.

In addition, the structure of the magnetic coupling between the female magnet member F_M and the male magnet member M_M may be performed such that the female magnet member F_M and the male magnet member M_M have an air gap therebetween so as not to be in contact with each other. That is, the female magnet member F_M and the male magnet member M_M may rotate without being in contact with each other, so unlike mechanical gears being in direct contact with each other, maximum allowable torque which can be transmitted between the magnets transmitting power may exist.

That is, torque which can be transmitted may be limited, so in the case of the application of at least the maximum allowable torque between the master 100c, the reducer 600c, and the slave 200c coupled to each other, the function of preventing damage to a motor mounted to the master 100c or the reducer 600c due to large torque while the magnets rotate idly, that is, a torque limit function may be embodied through the magnetic coupling.

Meanwhile, in the tool changing system according to the fifth embodiment of the present disclosure, a coupling mechanism between the master coupling part and the reduction input part 610c and a coupling mechanism between the reduction output part 650c and the slave coupling part 220c may be formed to correspond to each other.

More specifically, the coupling structure of the master coupling part and the reduction output part 650c may be formed such that the master coupling part and the reduction output part 650c correspond to each other, and the coupling structure of the reduction input part 610c and the slave coupling part 220c may be formed such that the reduction input part 610c and the slave coupling part 220c correspond to each other.

Figure 25:
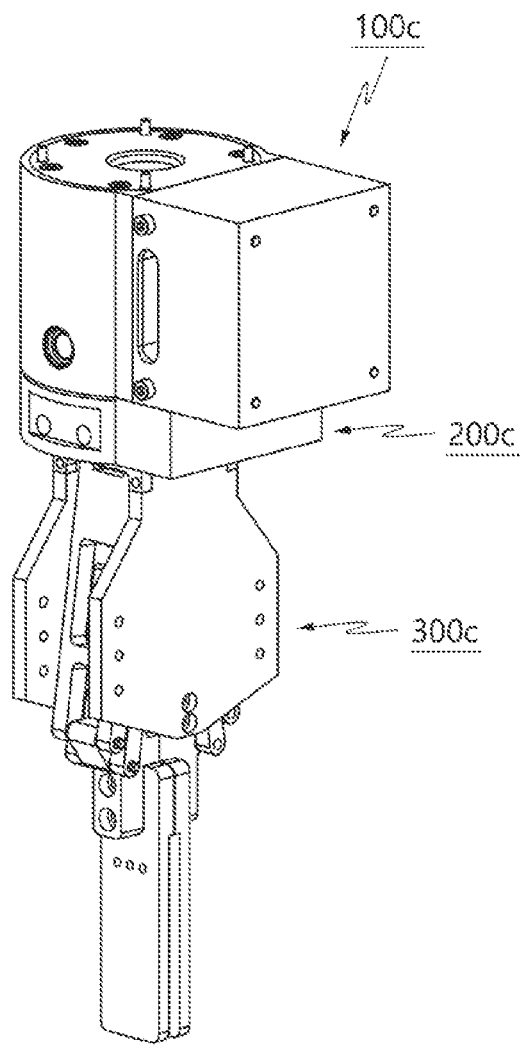
FIG. 25 is a view illustrating another example of the state of the use of the tool changing system according to the fifth embodiment of the present disclosure.

Accordingly, the master coupling part and the reduction input part 610c may be coupled to each other, and the reduction output part 650c and the slave coupling part 220c may be coupled to each other. As illustrated in FIG. 21, the reducer 600c may be installed and used between the master 100c and the slave 200c, and as illustrated in FIG. 25, the master coupling part and the slave coupling part 220c may be directly coupled to each other and used.

Likewise, each of multiple reducers 600c having various reduction ratios may be composed of the reduction input part 610c, the reduction part 630c, and the reduction output part 650c as described above, so through the replacement of the reducer 600c, the tool 300c having high torque/low speed performance or the tool 300c having low torque/high speed performance may be selectively applied and used.

Hereinafter, the configuration of the reducer 600c of the tool changing system according to the fifth embodiment of the present disclosure will be described in detail with reference to FIGS. 26 to 31.

Figure 26:
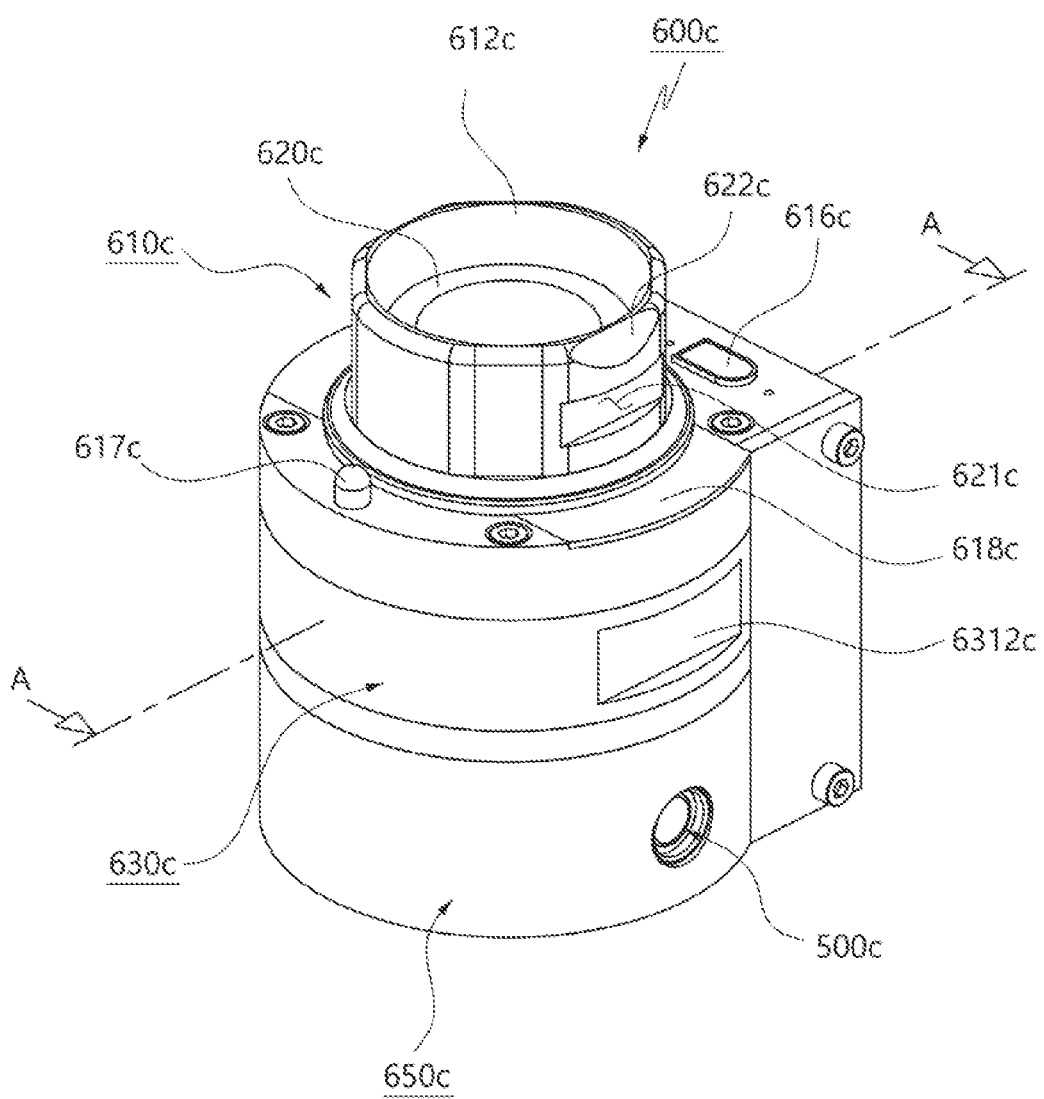
FIG. 26 is a perspective view of a reducer of the tool changing system according to the fifth embodiment of the present disclosure.

FIG. 26 is a perspective view of the reducer 600c of the tool changing system according to the fifth embodiment of the present disclosure.

As described above, the reducer 600c according to the fifth embodiment of the present disclosure may include the reduction input part 610c, the reduction part 630c, and the reduction output part 650c.

Figure 27:
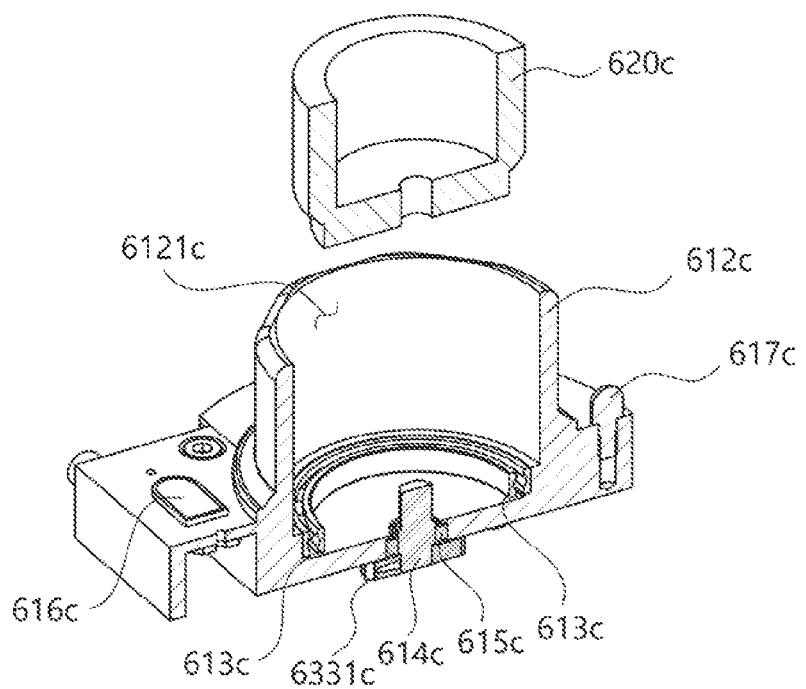
FIG. 27 is a sectional view illustrating the section of a reduction input part of the reducer taken along line A-A of FIG. 26.

The reduction input part 610c may be coupled to the master coupling part. FIG. 27 is a view illustrating the section of the reduction input part 610c. Referring to FIG. 27, the reduction input part 610c may include a reduction input housing 612c and a reduction input magnet 620c.

In the fifth embodiment of the present disclosure, the reduction input magnet 620c may be provided to have the shape of the female magnet member F_M illustrated FIG. 23. Accordingly, the magnet of the master 100c of the master coupling part coupled to the reduction input part 610c may be provided to have the shape of the male magnet member M_M such that the magnet of the master 100c is inserted into the reduction input magnet 620c having the shape of the female magnet member F_M.

The reduction input housing 612c may include an input-side magnet receiving space 6121c receiving the reduction input magnet 620c therein and having a cylindrical shape open upward. Here, the input-side magnet receiving space 6121c may receive the reduction input magnet 620c to cover the outer part of the reduction input magnet 620c received in the input-side magnet receiving space 6121c, and may protect the reduction input magnet 620c from an external impact.

The reduction input magnet 620c may be installed rotatably inside the input-side magnet receiving space 6121c. More specifically, a step may be formed at the bottom surface of the input-side magnet receiving space 6121c, and a bearing for an input magnet 613c may be installed at the bottom surface of the step. Here, the bearing for an input magnet 613c may be press-fitted to and mounted to the step. In addition, the reduction input magnet 620c may be inserted into an inner race of the bearing for an input magnet 613c, and may be installed rotatably inside the input-side magnet receiving space 6121c.

In the fifth embodiment of the present disclosure, the reduction input part 610c may further include a reduction input shaft 614c. The first end of the reduction input shaft 614c may be shaft-coupled to the reduction input magnet 620c, and a second end of the reduction input shaft 614c may be shaft-coupled to the reduction part 630c. The reduction input shaft 614c may be coupled to a first sun gear 6331c of the reduction part 630c to be described later, and the rotating force of the reduction input magnet 620c may be transmitted to the reduction part 630c.

Here, the reduction input shaft 614c may extend to the reduction part 630c through a hole (no reference numeral shown) formed in the bottom surface of the input-side magnet receiving space 6121c. For the efficient rotation of the reduction input shaft 614c, a bearing 615c may be press-fitted to the hole, and the reduction input shaft 614c may pass through an inner race of the bearing 615c and may be connected to the first sun gear 6331c of the reduction part 630c.

Meanwhile, the reduction input part 610c according to the fifth embodiment of the present disclosure may further include a reduction input connector 616c installed toward the master 100c. Here, when the master coupling part and the reduction input part 610c are coupled to each other, the reduction input connector 616c may be electrically connected to a master connector 170 to be described later provided in the master coupling part. This will be described in detail later.

In addition, the reduction input part 610c according to the fifth embodiment of the present disclosure may further include at least one reduction input alignment pin 617c formed by protruding upward from a flat surface outside of the reduction input housing 612c. Here, when the reduction input part 610c and the master coupling part are coupled to each other, the reduction input alignment pin 617c may be inserted to a master alignment groove 115c (see FIG. 32) formed in the lower surface of a master housing 110c of the master coupling part to be described later, whereby the position of the coupling of the master coupling part and the reduction input part 610c to each other may be aligned, and a radial outward movement thereof may be prevented.

Figure 28:
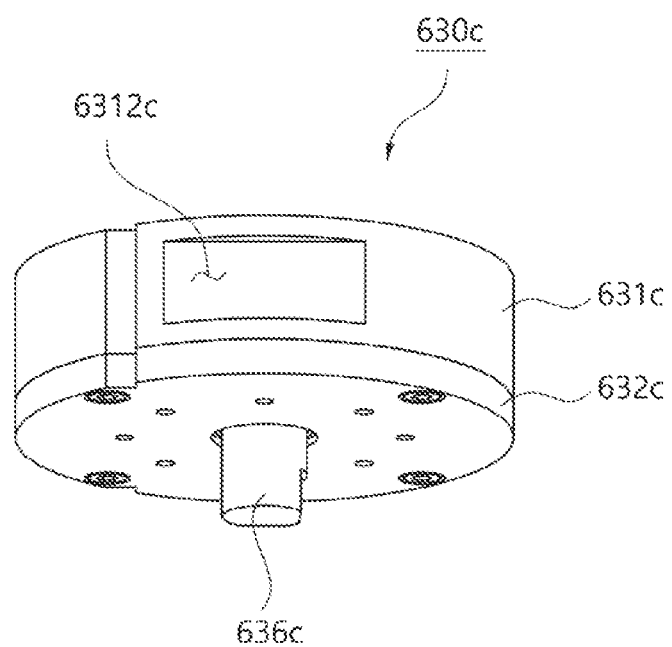
FIG. 28 is a perspective view of a reduction part of the reducer according to the fifth embodiment of the present disclosure.
Figure 29:
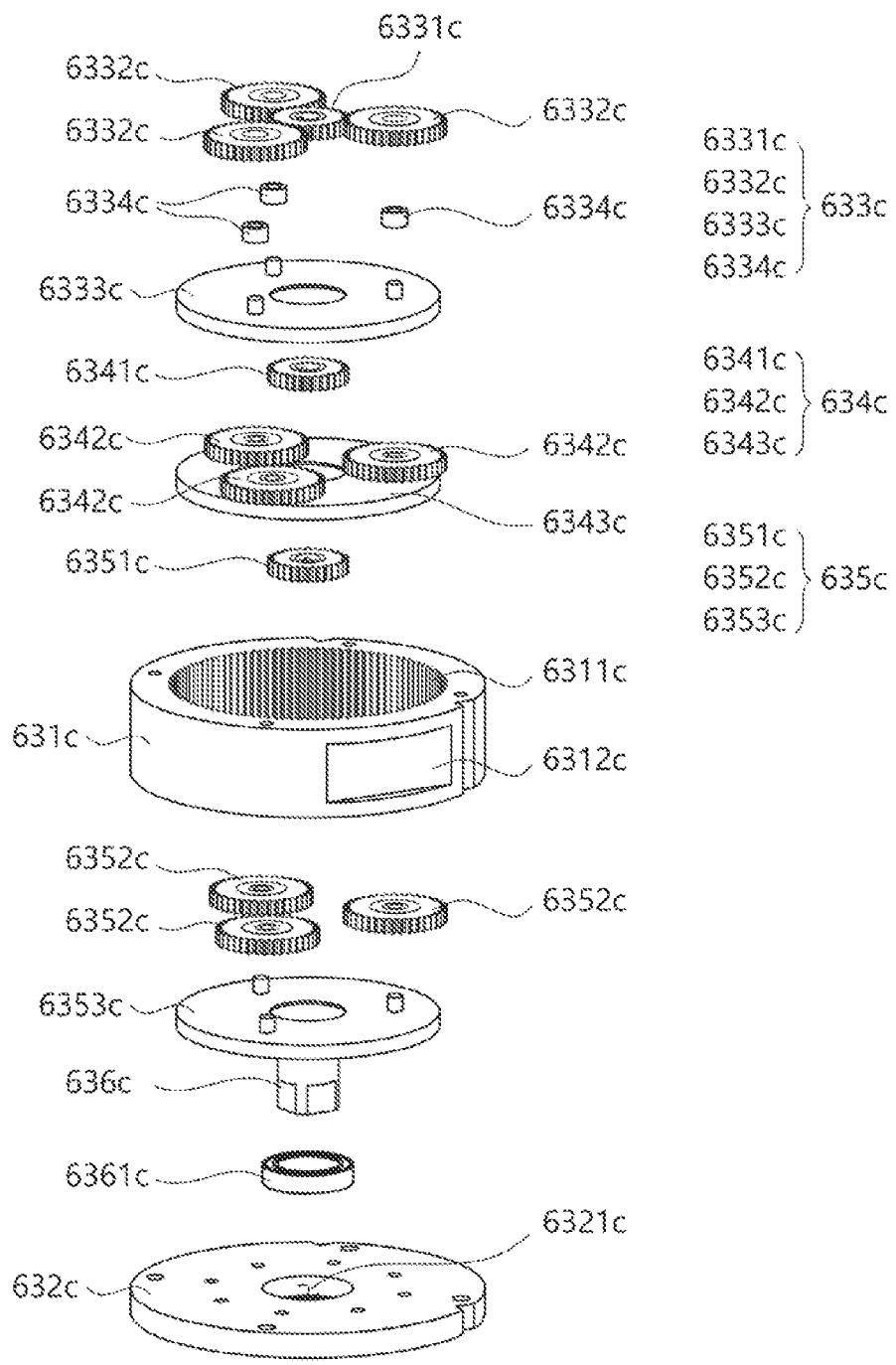
FIG. 29 is an exploded perspective view of the reduction part of the reducer according to the fifth embodiment of the present disclosure.

FIG. 28 is a perspective view of a reduction part 630c of the reducer 600c according to the fifth embodiment of the present disclosure, and FIG. 29 is an exploded perspective view of the reduction part 630c of the reducer 600c according to the fifth embodiment of the present disclosure.

Referring to FIGS. 28 and 29, the reduction part 630c according to the fifth embodiment of the present disclosure may include at least one planetary gear module 633c, 634c, or 635c. In addition, the reduction part 630c according to the fifth embodiment of the present disclosure may further include a reduction housing 631c receiving the planetary gear module 633c, 634c, or 635c therein.

The planetary gear module 633c, 634c, or 635c may reduce torque transmitted from the reduction input part 610c by a preset reduction ratio. In the present disclosure, as illustrated in FIG. 29, three planetary gear modules 633c, 634c, and 635c may be provided, but the number thereof is not limited thereto. Here, for the convenience of description, the three planetary gear modules may be defined as a first planetary gear module 633c, a second planetary gear module 634c, and a third planetary gear module 635c, respectively, to be described consecutively in a direction toward the reduction output part 650c from the reduction input part 610c.

The first planetary gear module 633c may include the first sun gear 6331c, a plurality of first planetary gears 6332c, and a first carrier.

As described above, the first sun gear 6331c may be shaft-coupled to the reduction input shaft 614c of the reduction input part 610c. The first sun gear 6331c may rotate in engagement with the plurality of first planetary gears 6332c. In the present disclosure, three first planetary gears 6332c may rotate in engagement with the first sun gear 6331c.

Each of the first planetary gears 6332c may be coupled rotatably to the first carrier. In the present disclosure, for the efficient rotation of each of the first planetary gears 6332c, first bushes 6334c may be fitted to the first carrier, to the first planetary gear 6332c may be coupled rotatably to the first carrier.

Here, in the present disclosure, as illustrated in FIGS. 28 and 29, the reduction housing 631c may be provided to have the shape of a ring gear covering an outer part of the planetary gear module 633c, 634c, or 635c. Accordingly, the first planetary gears 6332c, second planetary gears 6342c to be described later, and gear teeth 6311c engaged with third planetary gears 6352c may be formed on the inner wall surface of the reduction housing 631c and may guide the efficient rotations of the first planetary gear module 633c, the second planetary gear module 634c, and the third planetary gear module 635c, respectively.

Likewise, the second planetary gear module 634c may include a second sun gear 6341c, the plurality of second planetary gears 6342c, and a third carrier.

The second sun gear 6341c may be shaft-coupled to the first carrier and may rotate during the rotation of the first carrier. In addition, the plurality of second planetary gears 6342c may rotate in engagement with the second sun gear 6341c, and like the first planetary gears 6332c, may be mounted rotatably to a second carrier. Here, the second planetary gears 6342c may also be mounted rotatably to the second carrier through bushes (a reference numeral not shown). In addition, the rotation of the second planetary gears 6342c in engagement with the gear teeth 6311c formed on the inner wall surface of the reduction housing 631c may correspond to the rotation of the first planetary gears 6332c.

The third planetary gear module 635c may include a third sun gear 6351c, the plurality of third planetary gears 6352c, and the third carrier.

The third sun gear 6351c may be shaft-coupled to the second carrier and may rotate during the rotation of the second carrier. In addition, the plurality third planetary gears 6352c may rotate in engagement with the third sun gear 6351c, and like the first planetary gear 6332c, may be mounted rotatably to the third carrier. Here, the third planetary gears 6352c may also be mounted rotatably to the third carrier through bushes (no reference numeral shown). In addition, the rotation of the third planetary gears 6352c in engagement with the gear teeth 6311c formed on the inner wall surface of the reduction housing 631c may correspond to the rotation of the first planetary gears 6332c.

Here, a reduction output shaft 636c may be formed on the lower surface of the third carrier. The reduction output shaft 636c may constitute the rotating shaft of the third carrier, and may rotate with the rotation of the third carrier.

In the present disclosure, a reduction middle plate 632c may be coupled to the lower part of the reduction housing 631c and may cover the lower part of the reduction housing 631c. Here, a shaft through hole 6321c may be formed in the reduction middle plate 632c such that the reduction output shaft 636c passes through the reduction middle plate 632c in a direction toward the lower part thereof. Here, the reduction output shaft 636c may be mounted to be rotated through a bearing 6361C installed by being press-fitted to the shaft through hole 6321c.

Figure 30:
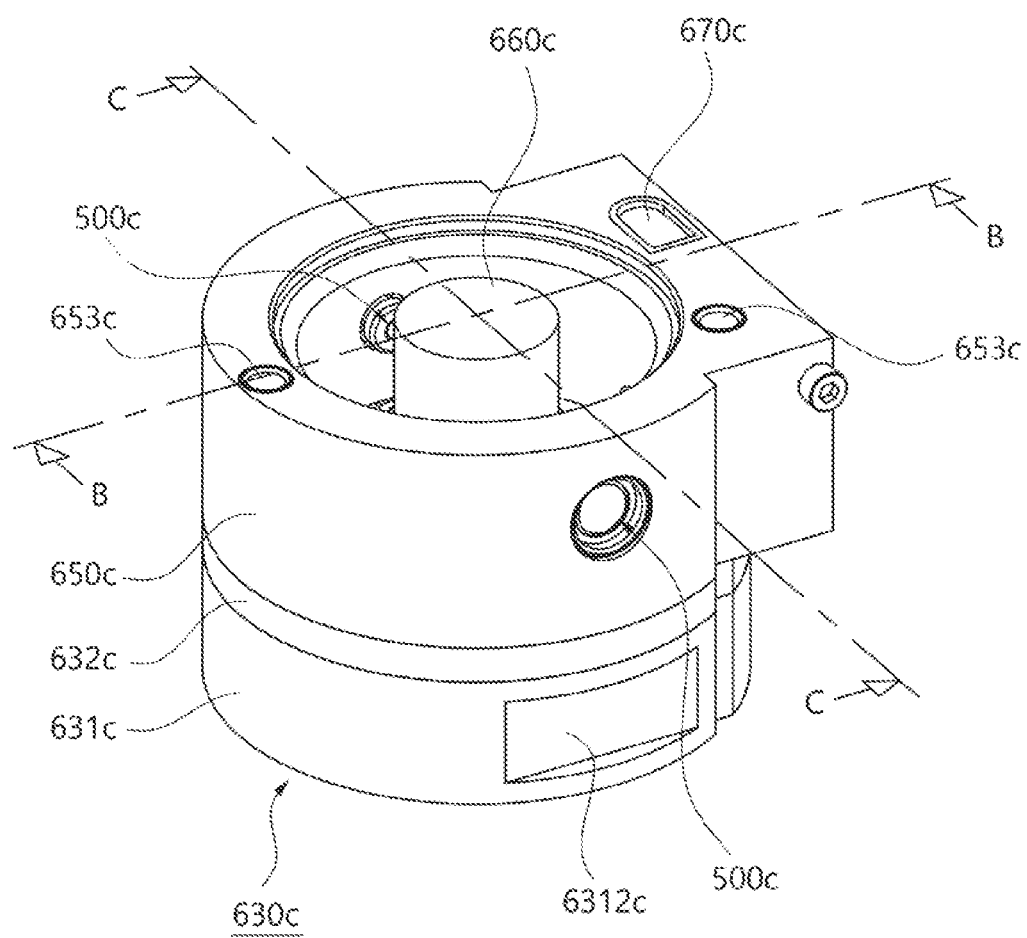
FIG. 30 is a perspective view of a reduction output part of the reducer according to the fifth embodiment of the present disclosure.
Figure 31:
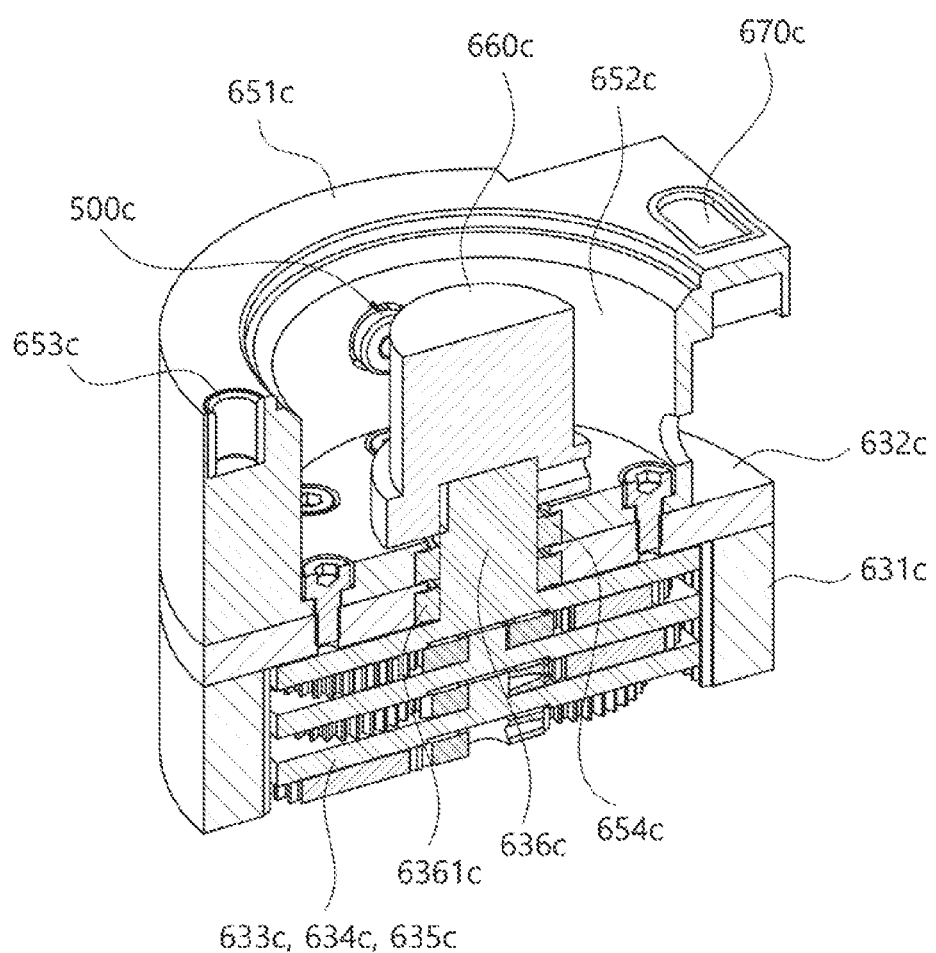
FIG. 31 is a sectional view taken along line B-B of FIG. 30.

FIG. 30 is a perspective view of the reduction output part 650c of the reducer 600c according to the fifth embodiment of the present disclosure, and FIG. 31 is a sectional view taken along line B-B of FIG. 30. FIGS. 30 and 31 are views shown from the bottom surface of the reduction output part 650c. In FIGS. 30 and 31, the reduction part 630c is illustrated to be located under the reduction output part 650c.

Referring to FIGS. 30 and 31, the reduction output part 650c according to the fifth embodiment of the present disclosure may include a reduction output housing 651c and a reduction output magnet 660c.

In the fifth embodiment of the present disclosure, the reduction output magnet 660c may be provided to have the shape of the male magnet member M_M illustrated in FIG. 23. Accordingly, a slave magnet 230c of the slave coupling part 220c coupled to the reduction output part 650c may be provided to have the shape of the female magnet member F_M such that the reduction output magnet 660c having the shape of the male magnet member M_M is inserted into the slave magnet 230c.

The reduction output housing 651c may have an output-side magnet receiving space 652c formed therein, the output-side magnet receiving space 652c receiving the reduction output magnet 660c therein, and the output-side magnet receiving space 652c may have a structure open to the slave coupling part 220c such that the reduction output housing 651c is coupled to the slave coupling part 220c.

The reduction output magnet 660c received in the reduction output housing 651c may be shaft-coupled to the reduction output shaft 636c protruding from the reduction part 630c. Here, the reduction output shaft 636c may be mounted to the reduction output housing 651c such that the reduction output shaft 636c is rotated through a bearing 654c installed by being press-fitted to a bearing groove (no reference numeral shown) formed at the bottom surface of the inside of the receiving space of the reduction output housing 651c. The reduction output shaft 636c may protrude to the inside of the output-side magnet receiving space 652c and may be shaft-coupled to the reduction output magnet 660c.

Meanwhile, the reduction output part 650c according to the fifth embodiment of the present disclosure may include a reduction output connector 670c installed toward the slave 200c. When the slave coupling part 220c and the reduction output part 650c are coupled to each other, the reduction output connector 670c may be electrically connected to a slave connector 270c to be describe later provided in the slave coupling part 220c. This will be described in detail later.

In addition, the reduction output part 650c according to the fifth embodiment of the present disclosure may include at least one reduction output alignment groove 653c formed by being recessed from a flat surface of the reduction output housing 651c facing the slave coupling part 220c.

Here, when the reduction output alignment groove 653c is coupled to the slave coupling part 220c, a slave alignment pin 212c (see FIG. 34) formed on an upper flat surface of a slave housing 210c of the slave coupling part 220c to be described later may be inserted into the reduction output alignment groove 653c, whereby the position of the coupling of the slave coupling part 220c and the reduction output part 650c to each other may be aligned, and a radial outward movement thereof may be prevented.

Figure 32:
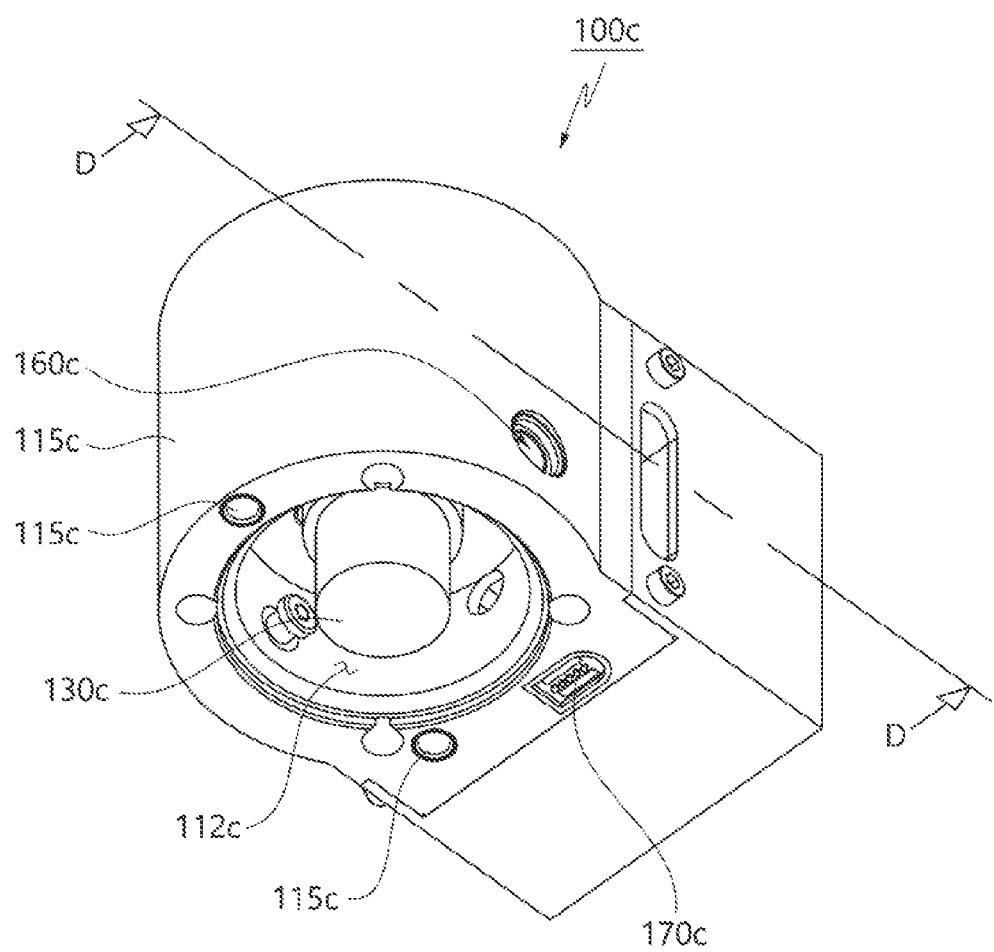
FIG. 32 is a perspective view of a master of the tool changing system according to the fifth embodiment of the present disclosure.
Figure 33:
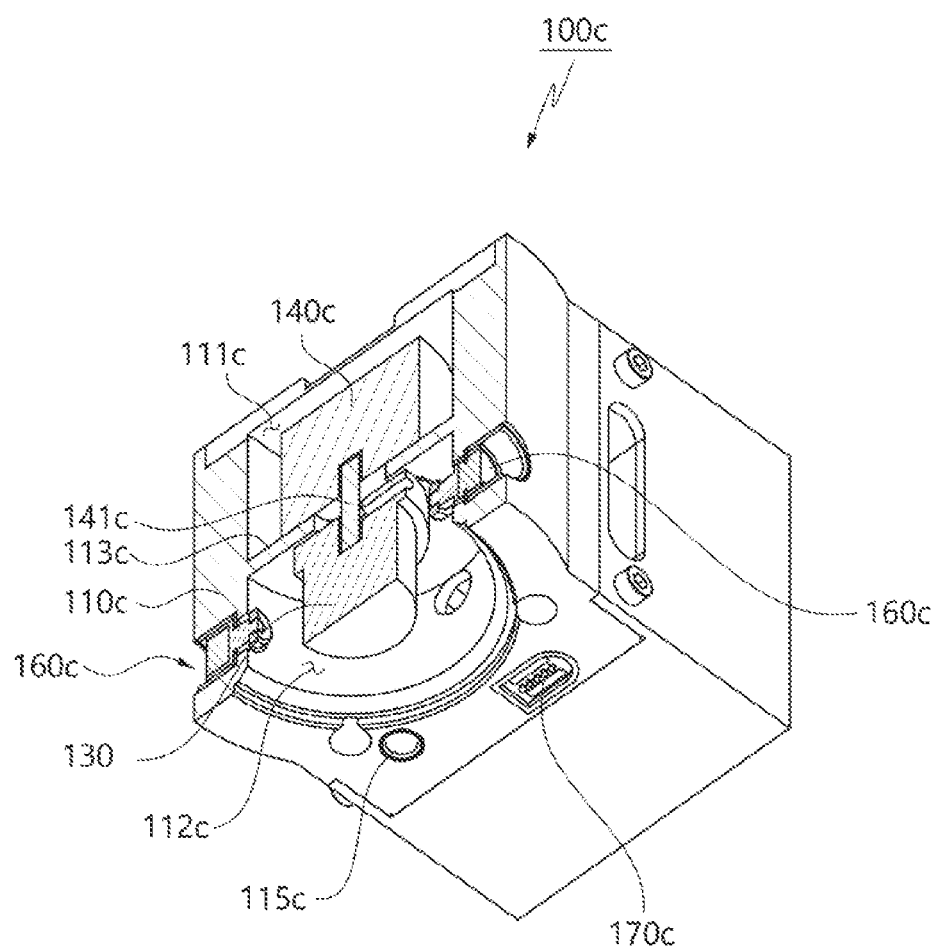
FIG. 33 is a sectional view taken along line D-D of FIG. 32.

Meanwhile, FIG. 32 is a perspective view of the master 100c of the tool changing system according to the fifth embodiment of the present disclosure, FIG. 33 is a sectional view taken along line D-D of FIG. 32.

Referring to FIGS. 32 and 33, the master 100c according to the fifth embodiment of the present disclosure may include the master housing 110c and the master coupling part.

The master housing 110c may be coupled to the end of the robot manipulator. The master coupling part may be formed at the front end of the master housing 110c through the coupling of the magnet of the master 100c and a second receiving space 112c defined inside the master housing 110c.

In the present disclosure, as illustrated in FIG. 33, the master housing 110c and the master coupling part may be formed to be integrated with each other. The master housing 110c may have a first receiving space 111c and the second receiving space 112c separated from each other by a partition wall 113c provided inside the master housing 110c.

An actuator 140c such as a motor may be received in the first receiving space 111c. Additionally, the magnet of the master 100c may be received in the second receiving space 112c. As described above, the reduction input magnet 620c installed in the reduction input part 610c may be provided to have the shape of the female magnet member F_M illustrated in FIG. 23. The magnet of the master 100c may be provided to have the shape of the male magnet member M_M to be inserted into the reduction input magnet 620c having the shape of the female magnet member F_M.

Here, the magnet of the master 100c may be connected to a motor through the rotating shaft 141c of the master 100c passing through a through hole (no reference numeral shown) formed in the partition wall 113c and may be rotated according to the rotation of the motor. The rotating shaft 141c of the master 100c may be mounted rotatably to the master housing 110c through a bearing (not shown) press-fitted to the through hole.

As described above, the master coupling part may have a structure corresponding to the reduction output part 650c of the reducer 600c. That is, the magnet of the master 100c may be provided to correspond to the reduction output magnet 660c, and the second receiving space 112c of the master coupling part may be provided to correspond to the output-side magnet receiving space 652c of the reduction housing 631c described above.

According to this configuration, when the reduction input housing 612c is inserted into the second receiving space 112c of the master coupling part in the process of the coupling of the master coupling part and the reduction input part 610c of the reducer 600c to each other, the reduction input housing 612c is inserted into space between the inner wall surface of the second receiving space 112c of the master coupling part and the magnet of the master 100c. In this case, the magnet of the master 100c may be inserted into and coupled to the reduction input magnet 620c having a cylindrical shape.

Meanwhile, the master coupling part according to the fifth embodiment of the present disclosure may further include the master connector 170 installed toward the reduction input part 610c. Here, the master connector 170 may be electrically connected to the reduction input connector 616c, which is described above, formed in the reduction input part 610c when the master coupling part and the reduction input part 610c are coupled to each other.

In addition, the master coupling part according to the fifth embodiment of the present disclosure may further include at least one master alignment groove 115*c* formed by being recessed from the surface of the master housing 110*c* facing the surface of the reduction input part 610*c*.

Here, when the master coupling part and the reduction input part 610*c* are coupled to each other, the reduction input alignment pin 617*c* provided in the reduction input part 610*c* may be inserted to the master alignment groove 115*c*, whereby the position of the coupling of the master coupling part and the reduction input part 610*c* to each other may be aligned, and the radial outward movement thereof may be prevented.

As described above, the coupling structure of the master coupling part and the reduction output part 650*c* to each other may be provided such that the master coupling part and the reduction output part 650*c* correspond to each other; the position and structure of the master connector 170 and the reduction output connector 670*c* may be provided such that the master connector 170 and the reduction output connector 670*c* correspond to each other; and the position and structure of the master alignment groove 115*c* and the reduction output alignment groove 653*c* may be provided such that the master alignment groove 115*c* and the reduction output alignment groove 653*c* correspond to each other, whereby the slave coupling part 220*c* may be connected directly to the master coupling part.

Figure 34:
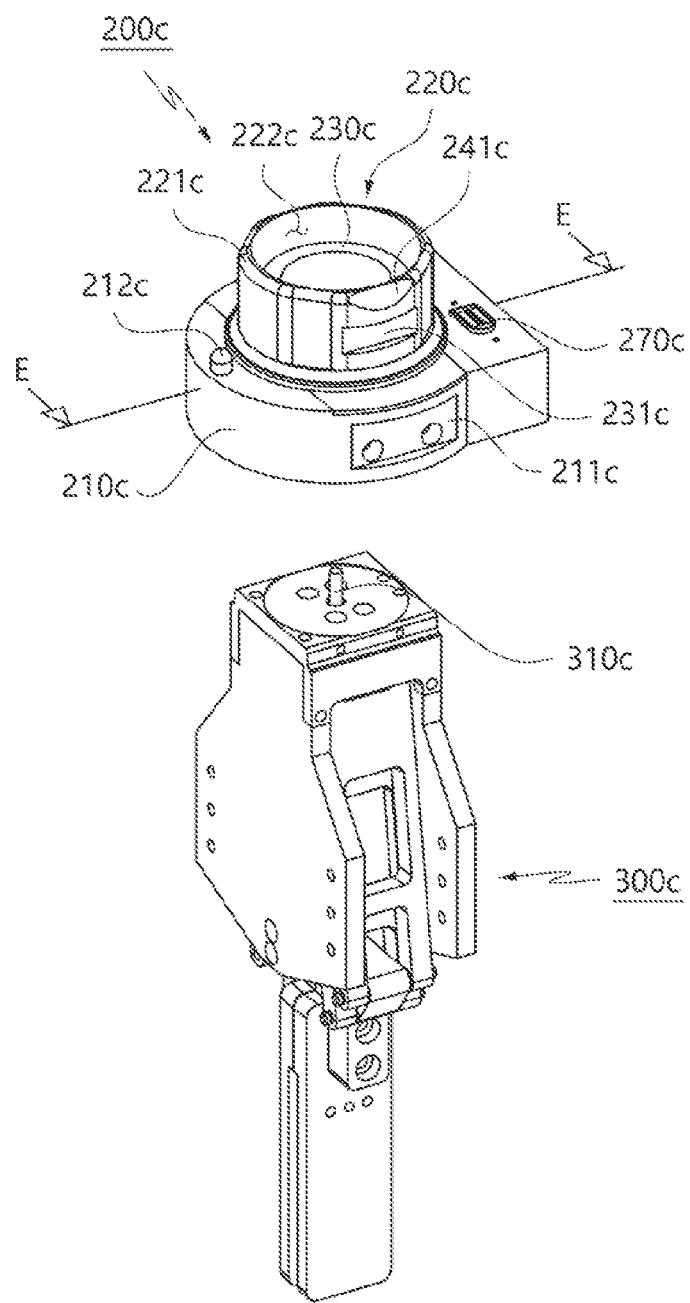
FIG. 34 is a perspective view of a slave of the tool changing system according to the fifth embodiment of the present disclosure.
Figure 35:
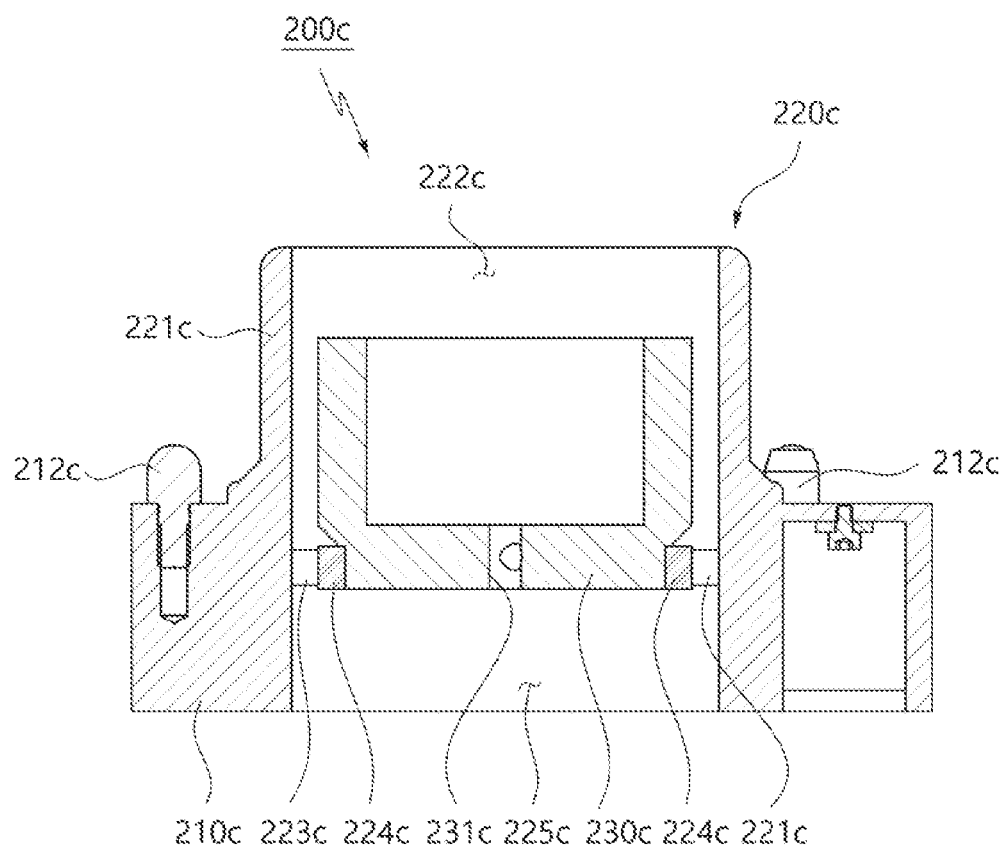
FIG. 35 is a sectional view taken along line E-E of FIG. 34.

FIG. 34 is a perspective view of the slave 200*c* according to the fifth embodiment of the present disclosure, and FIG. 35 is a sectional view taken along line E-E of FIG. 34;

Referring to FIGS. 34 and 35, the slave 200*c* according to the fifth embodiment of the present disclosure may include the slave coupling part 220*c* and the slave housing 210*c*.

As described above, the slave coupling part 220*c* may be coupled to the reduction output part 650*c* of the reducer 600*c* and may couple the reducer 600*c* and the slave 200*c* to each other.

The slave coupling part 220*c* according to the fifth embodiment of the present disclosure may include a slave coupling housing 221*c* and the slave magnet 230*c* described above.

The slave coupling housing 221*c* may include a slave magnet receiving space 222*c* receiving the slave magnet 230*c* therein and having a cylindrical shape open upward. Here, the slave magnet receiving space 222*c* may receive the slave magnet 230*c* to cover the outer part of the slave magnet 230*c* received in the slave magnet receiving space 222*c*, and may protect the slave magnet 230*c* from an external impact.

The slave housing 210*c* may be provided at an opposite side of the slave coupling part 220*c*, that is, at a side directed to the tool 300*c*, and may be coupled to the tool 300*c*. In the present disclosure, as illustrated in FIG. 35, the slave housing 210*c* and the slave coupling housing 221*c* may be formed to be integrated with each other. The slave housing 210*c* may have the slave magnet receiving space 222*c* and a tool coupling space 225*c* separated from each other by a partition wall 223*c* provided inside the slave housing 210*c*.

The slave magnet 230*c* may be rotatably coupled to the inside of the slave magnet receiving space 222*c*. In the present disclosure, the reduction output magnet 660*c* may be provided to have the shape of the male magnet member M_M. The slave magnet 230*c* may be provided to have the shape of the female magnet member F_M allowing the male magnet member M_M to be inserted thereinto. Here, the slave magnet 230*c* may be installed rotatably inside the slave coupling housing 221*c* through a bearing 224*c* press- fitted to a magnet fastening hole (no reference numeral shown) formed in the partition wall 223*c* located inside the slave magnet.

The tool 300*c* may be inserted into a tool coupling space 223*c* and may be coupled to the slave 200*c*. After the end of the tool 300*c* is inserted into the tool coupling space 223*c*, the tool 300*c* may be bolted to the slave 200*c*.

Here, the tool 300*c* may have a tool rotating shaft 310*c* formed on the end thereof so as to receive torque generated by the rotation of the slave magnet 230*c*. When the end of the tool 300*c* is inserted into the tool coupling space 225*c*, the tool rotating shaft 310*c* may be inserted into a shaft coupling hole 231*c* formed in the slave magnet 230*c*, and be rotated with the rotation of the slave magnet 230*c*, so the tool rotating shaft 310*c* may transmit the torque to the tool 300*c*.

Meanwhile, the slave coupling part 220*c* according to the fifth embodiment of the present disclosure may further include the slave connector 270*c* installed toward the reducer 600*c*. Here, when the slave 200*c* and the reduction output part 650*c* are coupled to each other, the slave connector 270*c* may be electrically connected to the reduction output connector 670*c* which is provided in the reduction output part 650*c*.

In addition, the slave coupling part 220*c* according to the fifth embodiment of the present disclosure may include at least one slave alignment pin 212*c* formed by protruding upward from an outer flat surface of the slave housing 210*c*. Here, when the slave coupling part 220*c* and the reduction output part 650*c* are coupled to each other, the slave alignment pin 212*c* may be inserted to the reduction output alignment groove 653*c* provided in the reduction output part 650*c*, so the position of the coupling of the slave coupling part 220*c* and the reduction output part 650*c* to each other may be aligned and a radial outward movement thereof may be prevented.

According to the configuration described above, when the slave coupling housing 221*c* is inserted into the output-side magnet receiving space 652*c* of the reduction output part 650*c* in the process of the coupling of the slave coupling part 220*c* and the reduction output part 650*c* to each other, the slave coupling housing 221*c* may be inserted into space between the inner wall surface of the output-side magnet receiving space 652*c* of the reduction output part 650*c* and the reduction output magnet 660*c*. In this case, the reduction output magnet 660*c* may be inserted into and coupled to the slave magnet 230*c* having a cylindrical shape.

Such a coupling structure may correspond to the coupling structure between the master coupling part and the reduction input part 610*c* described above. The slave coupling part 220*c* may be coupled to the master coupling part in the same manner.

Meanwhile, as illustrated in FIGS. 26 and 30, the reducer 600*c* according to the fifth embodiment of the present disclosure may further include a reducer removal prevention unit 500*c*. In addition, as illustrated in FIGS. 32 and 33, the master 100*c* according to the fifth embodiment of the present disclosure may further include a master removal prevention unit 160*c*.

The reducer removal prevention unit 500*c* may be mounted to the reduction output part 650*c*. Furthermore, the reducer removal prevention unit 500*c* may prevent the removal of the slave 200*c* by protruding from the reduction output part 650*c* to the slave coupling part 220*c* with the reduction output part 650*c* and the slave 200*c* coupled to each other.

Likewise, the master removal prevention unit 160*c* may be mounted to the master coupling part. Additionally, the master removal prevention unit 160c may prevent the removal of the reducer 600c by protruding from the master coupling part to the reduction input part 610c, with the master coupling part and the reduction input part 610c coupled to each other.

Here, the reducer removal prevention unit 500c and the master removal prevention unit 160c may be formed in a pair to be symmetrical to the outer sides of the reduction output part 650c and the master coupling part, respectively.

Meanwhile, the slave 200c may further include a slave pin coupling groove 231c formed in the slave coupling part 220c. Here, when the reduction output part 650c and the slave coupling part 220c are coupled to each other, the reducer removal prevention unit 500c may be inserted to and held in the slave pin coupling groove 231c, so the slave 200c may be prevented from being removed from the reducer 600c. The reducer removal prevention unit 500c may be provided to have a pair of reducer removal prevention units symmetrical to each other, and in correspondence thereto, the slave pin coupling groove 231c may also be provided to have a pair of slave pin coupling grooves 231c symmetrical to each other in the slave coupling part 220c.

In addition, the reducer 600c may further include a reducer pin coupling groove formed in the reduction input part 610c. Here, when the reduction input part 610c and the master coupling part are coupled to each other, the master removal prevention unit 160c may be inserted to and held in the reducer pin coupling groove, the reducer 600c may be prevented from being removed from the master 100c.

As described above, attraction by the magnetic coupling between the magnet of the master 100c and the reduction input magnet 620c, and attraction by the magnetic coupling between the slave magnet 230c and the reduction output magnet 660c may maintain the coupling of the master 100c and the reducer 600c to each other and the coupling of the slave 200c and the reducer 600c to each other, respectively. The master removal prevention unit 160c and the reducer removal prevention unit 500c may be held in the reducer pin coupling groove and the slave pin coupling groove 231c, respectively, so the more stable coupling of the slave, the reducer, and the master to each other may be maintained.

Figure 36A:
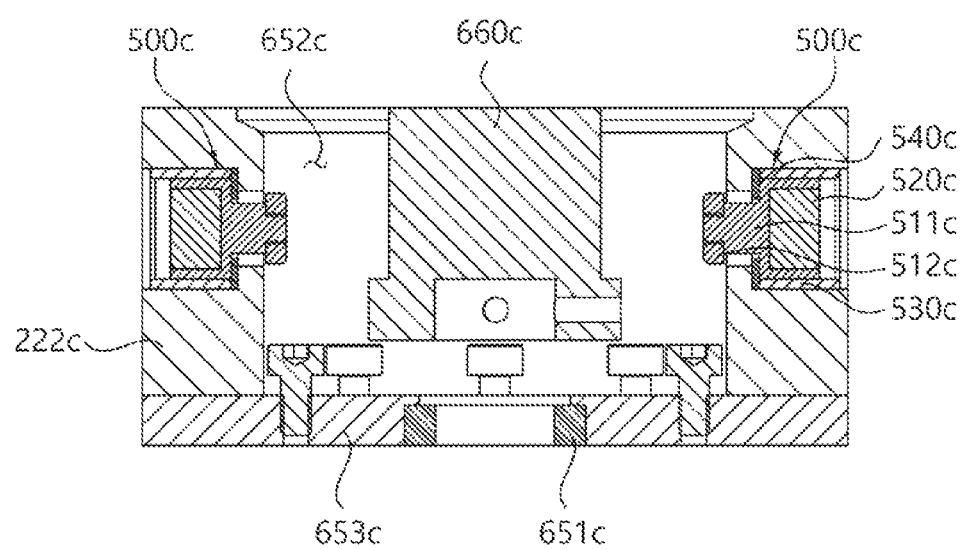
FIGS. 36A and 36B are sectional views taken along line C-C of FIG. 30.
Figure 36B:
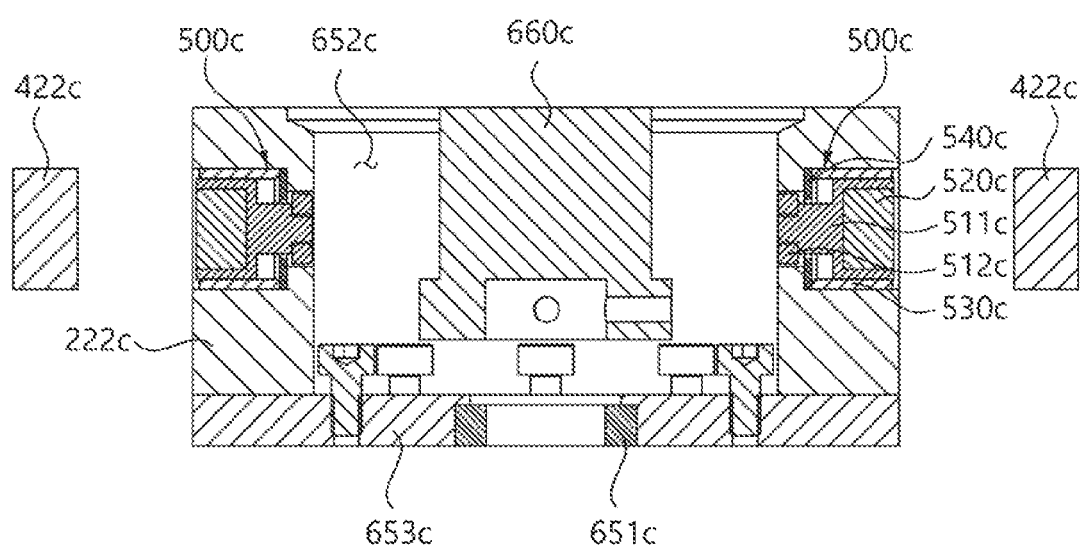

FIGS. 36A and 36B are views illustrating the reducer removal prevention unit 500c according to the fifth embodiment of the present disclosure, and are views illustrating the section of the reduction output part 650c of the reducer 600c.

Referring to FIGS. 36A and 36B, the reducer removal prevention unit 500c may include a pin module 511c and 512c, a pin receiving part 530c, a removal prevention magnet 520c, and a steel washer 540c.

The pin module 511c and 512c may be inserted into the slave pin coupling groove 231c. In the present disclosure, the pin module 511c and 512c may be formed by screwing a nut pin 512c to a front end of a pin holder 511c.

The pin receiving part 530c may be provided to have a shape approximate to a cylindrical shape, and the nut pin 512c of the pin module 511c and 512c may be exposed forward. The pin receiving part 530c may receive the pin module 511c and 512c such that the pin holder 511c moves in forward and rearward directions. Furthermore, the removal prevention magnet 520c may be coupled to the rear of the pin module 511c and 512c.

The steel washer 540c having a through hole formed in a front-to-rear direction therethrough may be mounted to the front of the pin receiving part 530c. Here, the front end of the pin holder 511c may be exposed through the through hole of the steel washer 540c, and a state in which the nut pin 512c screwed to the front end of the pin holder 511c is held by the steel washer 540c may be maintained.

According to the configuration described above, magnetic attraction may be produced between the steel washer 540c and the removal prevention magnet 520c by the magnetism of the removal prevention magnet 520c, and the removal prevention magnet 520c mounted to the rear of the pin module 511c and 512c may move the pin module 511c and 512c forward, that is, in a direction of inserting the pin module 511c and 512c into the slave pin coupling groove 231c by the magnetic attraction. Accordingly, as illustrated in FIG. 36A, the front end of the pin module 511c and 512c may be protruded to the inside of the receiving space of the reduction output part 650c.

In this state, in the process of the coupling of the reduction output part 650c and the slave coupling part 220c to each other, as described above, when the slave coupling housing 221c is inserted into the reduction output part 650c, the slave coupling housing 221c may be inserted to space between the inner wall surface of the receiving space of the reduction output part 650c and the reduction output magnet 660c. In the insertion process, after the pin module 511c and 512c is moved back by being in contact with an outer surface of the slave coupling housing 221c, the pin module 511c and 512c may be inserted into and held in the slave pin coupling groove 231c of the slave coupling housing 221c.

Here, for the efficient removal of the pin module 511c and 512c from the slave pin coupling groove 231c and for the efficient insertion of the pin module 511c and 512c into the slave pin coupling groove 231c, a chamfered part 241c of the slave 200c may be formed at the upper end of the slave pin coupling groove 231c of the slave coupling housing 221c as illustrated in FIG. 34.

Meanwhile, the master removal prevention unit 160c may have a configuration corresponding to the reducer removal prevention unit 500c. That is, the master removal prevention unit 160c may also be composed of the pin module 511c and 512c inserted to the reducer pin coupling groove, the pin receiving part 530c, the removal prevention magnet 520c, and the steel washer 540c. Likewise, as illustrated in FIG. 26, a reduction chamfered part 622c may be formed in the reduction input housing 612c of the reduction input part 610c. Here, the operation method of the master removal prevention unit 160c may correspond to the operation method of the reducer removal prevention unit 500c, and a detailed description thereof will be omitted.

As described above, in a state in which the master removal prevention unit 160c or the reducer removal prevention unit 500c is inserted into the reducer pin coupling groove or the slave pin coupling groove 231c, respectively, a driving magnet 422c supplying magnetism capable of overcoming attraction between the steel washer 540c and the removal prevention magnet 520c may be approached to release the insertion of the master removal prevention unit 160c or the reducer removal prevention unit 500c as illustrated in FIG. 36B, the pin module 511c and 512c may be moved back by attraction between the removal prevention magnet 520c and the driving magnet 422c, so the coupling of the master removal prevention unit 160c and the reducer removal prevention unit 500c to the reducer pin coupling groove and the slave pin coupling groove 231c, respectively, may be released.

In the fifth embodiment of the present disclosure, the driving magnet 422c may be mounted to the tool mount 400c.

The tool mount 400c according to the fifth embodiment of the present disclosure may be provided to mount the slave 200c or the reducer 600c thereto.

Referring to FIG. 21, and FIGS. 37 to 41, the tool mount 400c according to the fifth embodiment of the present disclosure may include a base plate 410c and the tool mounting part 420c.

The tool mounting part 420c may be arranged to be spaced apart upward from the base plate 410c, and in the present disclosure, multiple supports 430c may connect the tool mounting part 420c to the base plate 410c.

In the present disclosure, the tool mounting part 420c may have the shape of a horseshoe open at a front thereof. Accordingly, the slave 200c or the reducer 600c may be introduced to and mounted to the tool mounting part 420c from the front thereof.

More specifically, a mounting rib 421c may be formed on each of the opposite sides of the inner wall surface of the tool mounting part 420c by protruding inward therefrom, the mounting ribs 421c being symmetrical to each other. Furthermore, the reducer 600c may have a reducer mounting groove 6312c formed by being recessed at the outer surface of the reduction part 630c, wherein the reducer mounting groove 6312c may have a pair of reducer mounting grooves corresponding to the mounting ribs 421c. Likewise, the slave 200c may have a slave mounting groove 211c formed by being recessed at an outer surface thereof, wherein the slave mounting groove 211c may have a pair of slave mounting grooves formed by corresponding to the mounting ribs 421c. Here, the slave mounting groove 211c may be provided in the slave housing 210c.

Meanwhile, the driving magnet 422c described above may be mounted to the tool mounting part 420c. Here, an interval between the driving magnet 422c and the mounting rib 421c may be formed to correspond to an interval between the slave mounting groove 211c and the reducer removal prevention unit 500c when the slave 200c and the reducer 600c are coupled to each other. Likewise, the interval between the driving magnet 422c and the mounting rib 421c may correspond to an interval between the reducer mounting groove 6312c and the reducer removal prevention unit 500c when the master 100c and the reducer 600c are coupled to each other.

Figure 37:
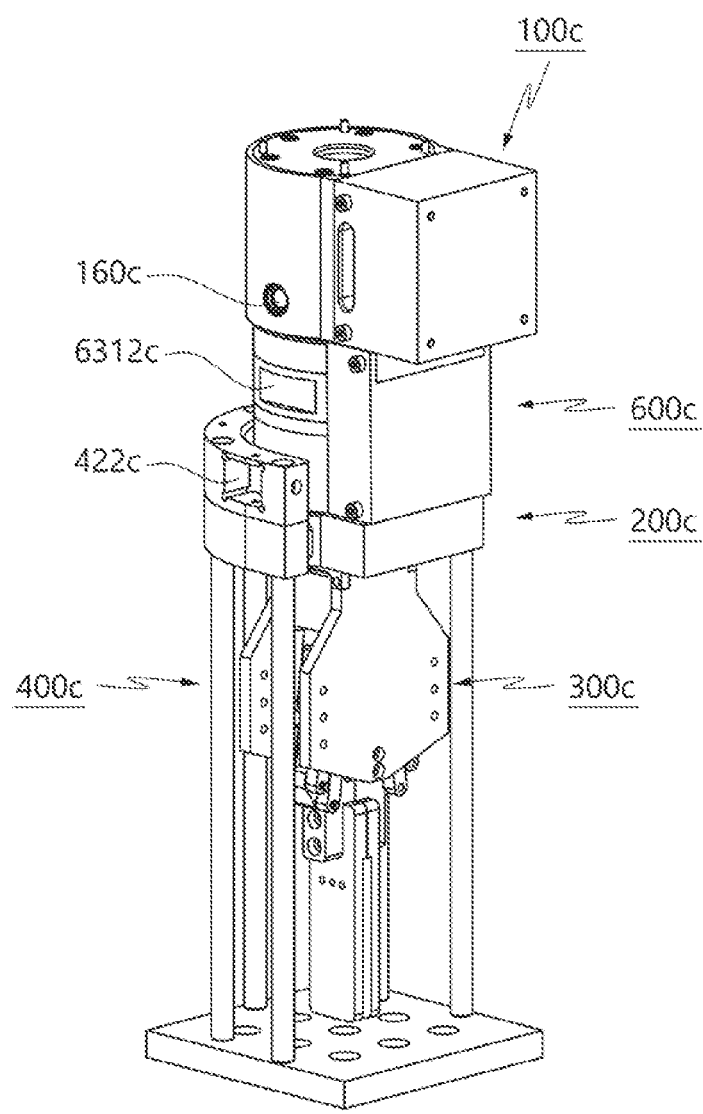
FIGS. 37 to 41 are views illustrating the decoupling process of the slave or the reducer by using the tool mount in the tool changing system of the present disclosure.

According to the above configuration, as illustrated in FIGS. 21 and 37, when decoupling the slave 200c from the reducer 600c with the slave 200c, the reducer 600c, and the master 100c are coupled to each other, the slave 200c may be introduced to the tool mounting part 420c from the front thereof as illustrated in FIG. 37. In this case, the mounting rib 421c of the tool mounting part 420c may be slidably inserted to and held in the slave mounting groove 211c, so the slave 200c may be mounted to the tool mounting part 420c.

In this case, interval between the mounting rib 421c and the driving magnet 422c may correspond to the interval between the slave mounting groove 211c and the reducer removal prevention unit 500c. With the slave 200c mounted to the tool mounting part 420c, the driving magnet 422c may be located at the outer side of the reducer removal prevention unit 500c.

Figure 38:
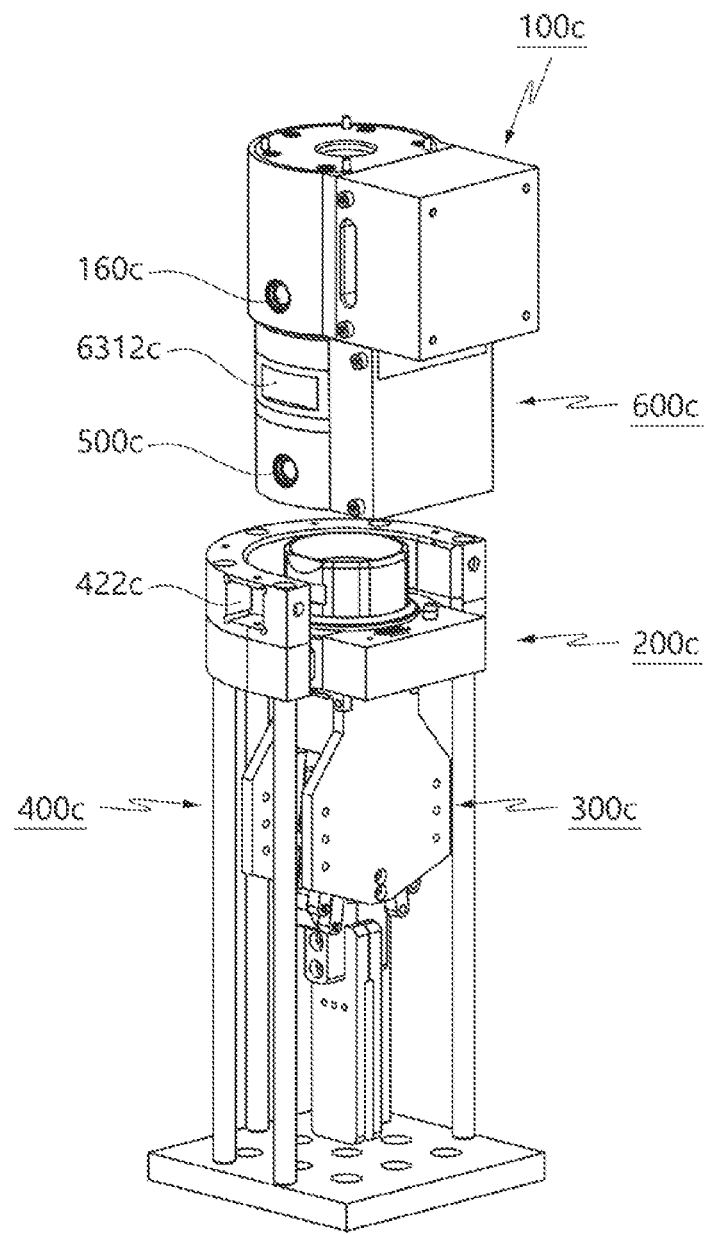

Accordingly, the pin module 511c and 512c of the reducer removal prevention unit 500c may be moved toward the driving magnet 422c by the magnetism of the driving magnet 422c, and the pin module 511c and 512c may be removed from the slave pin coupling groove 231c, so the pin module held in the slave pin coupling groove 231c may be released. Accordingly, as illustrated in FIG. 38, the slave 200c may be decoupled from the reducer 600c.

Figure 39:
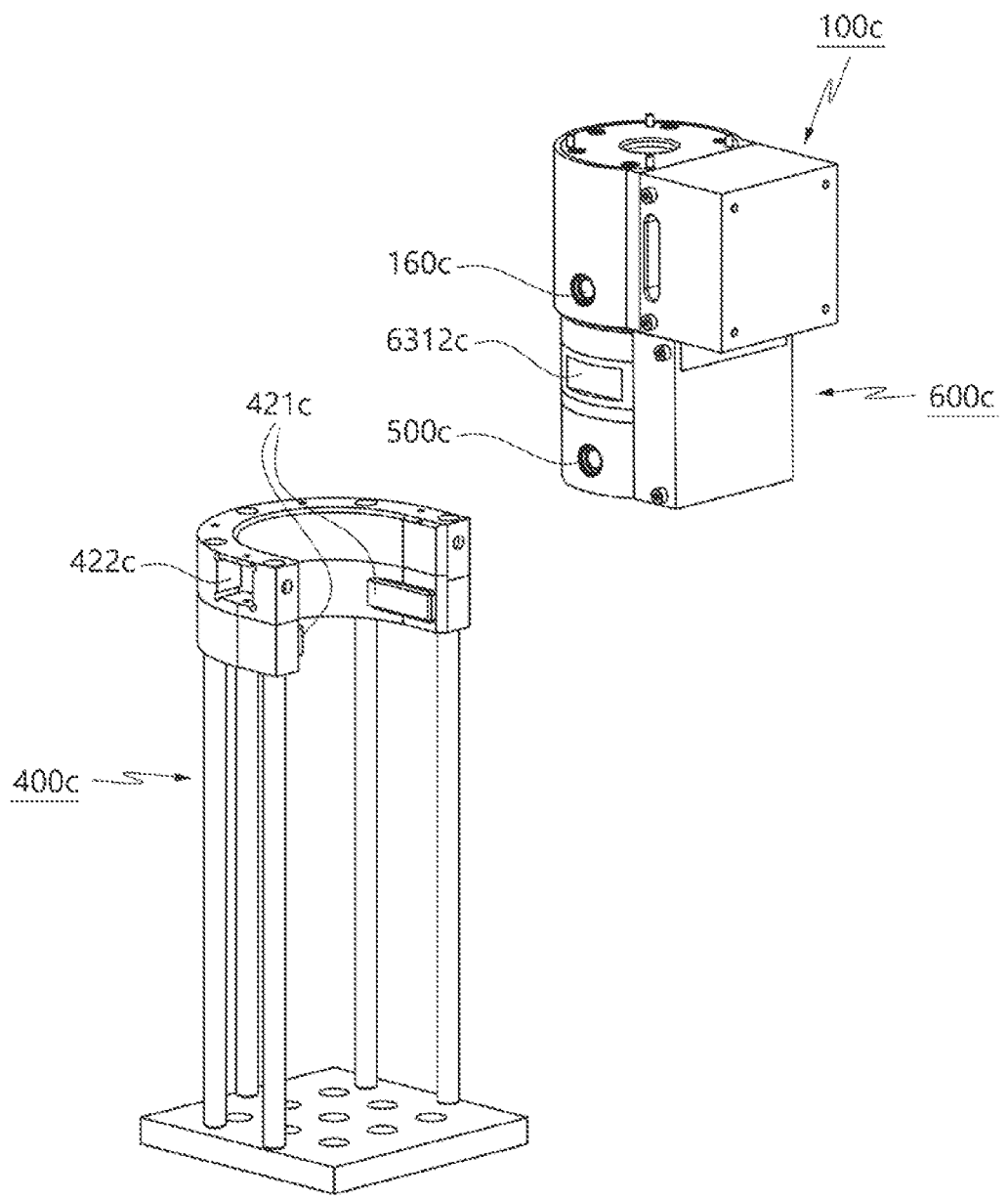
Figure 40:
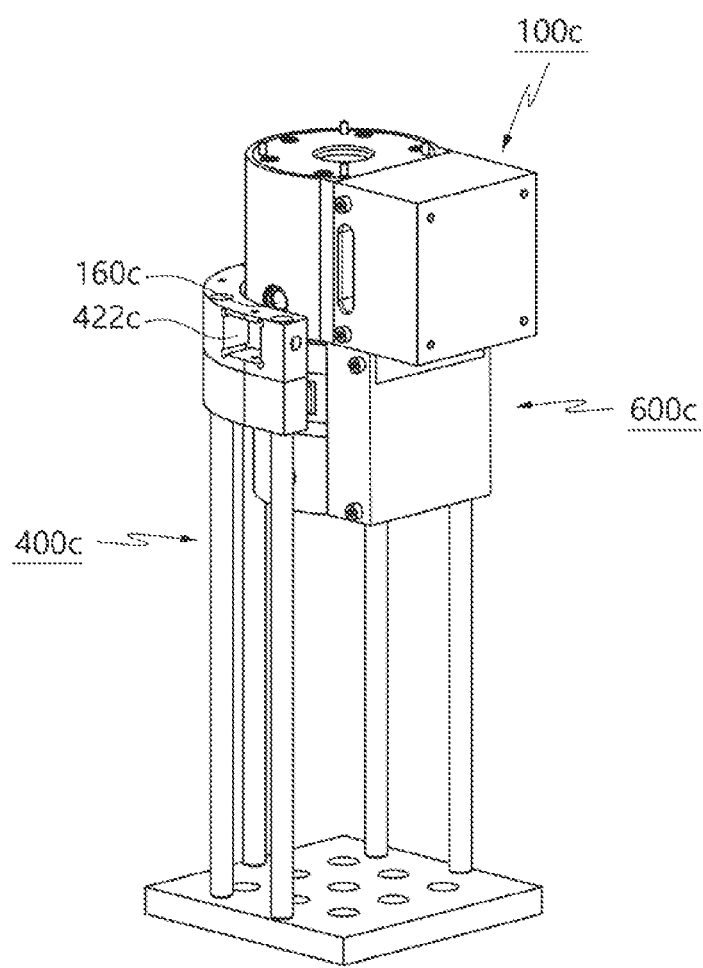

In the same manner, when decoupling the reducer 600c from the master 100c, the reducer 600c may be moved toward the front of the tool mounting part 420c of the tool mount 400c as illustrated in FIG. 39. Next, in a state in which the height of the mounting rib 421c of the tool mount 400c and the height of the reducer mounting groove 6312c formed in the reduction part 630c of the reducer 600c correspond to each other, while the reducer 600c may be introduced toward the front of the tool mounting part 420c as illustrated in FIG. 40, the mounting rib 421c of the tool mounting part 420c may be slidably inserted to and held in the reducer mounting groove 6312c, so the reducer 600c may be mounted to the tool mounting part 420c.

In this case, the interval between the mounting rib 421c and the driving magnet 422c may correspond to an interval between the reducer mounting groove 6312c and the master removal prevention unit 160c, so the driving magnet 422c may be located at the outer side of the master removal prevention unit 160c.

Figure 41:
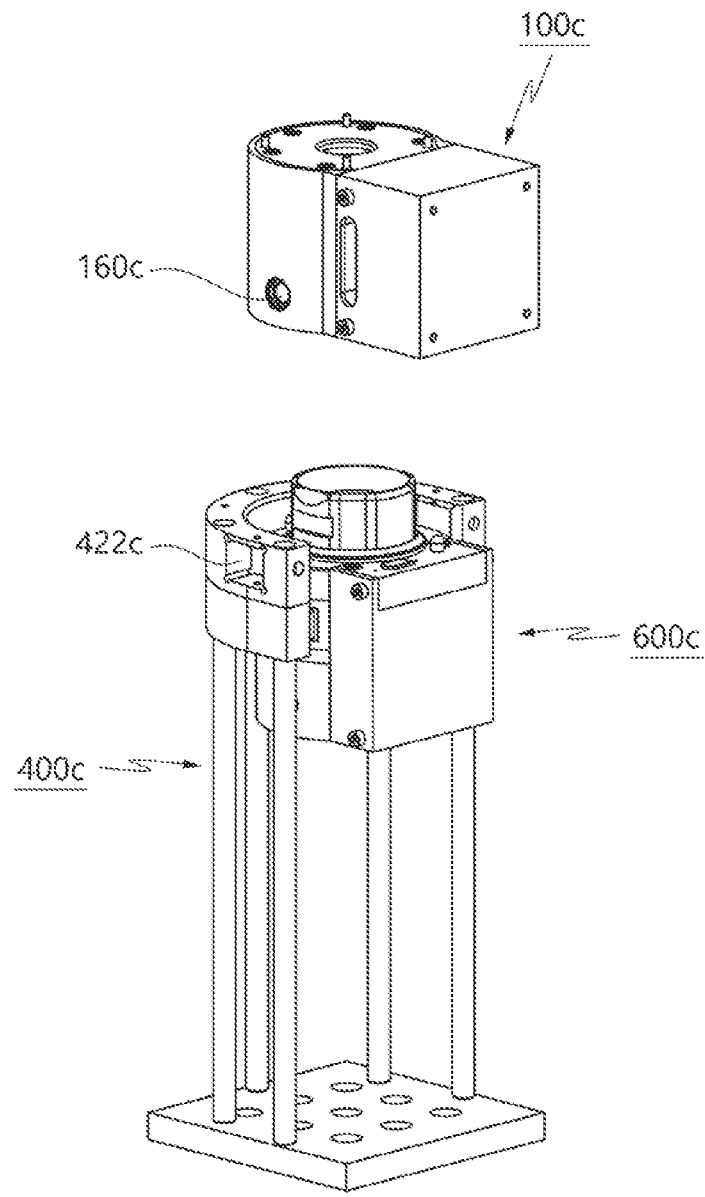

Accordingly, the pin module 511c and 512c of the master removal prevention unit 160c may be moved toward the driving magnet 422c by the magnetism of the driving magnet 422c, and the pin module 511c and 512c may be removed from the reducer pin coupling groove, so the holding may be released. Accordingly, as illustrated in FIG. 41, the reducer 600c may be decoupled from the master 100c.

Such a movement may be performed in the same manner even when the slave 200c is coupled directly to the master 100c as illustrated in FIG. 25. That is, when the slave mounting groove 211c is held by the mounting rib 421c, the master removal prevention unit 160c may be located to be adjacent to the driving magnet 422c, and the pin module 511c and 512c of the master removal prevention unit 160c may be moved back from the slave pin coupling groove 231c, so the slave 200c may be decoupled from the master 100c.

As described above, the master connector 170 may be formed in the master coupling part, and the reduction input connector 616c may be formed in the reduction input part 610c. Likewise, the reduction output connector 670c may be formed in the reduction output part 650c, and the slave connector 270c may be formed in the slave coupling part 220c.

According to such configuration, when the master 100c and the reducer 600c are coupled to each other, the master connector 170 and the reduction input connector 616c may be electrically connected to each other, and when the slave 200c and the reducer 600c are coupled to each other, the slave connector 270c and the reduction output connector 670c may be coupled to each other. When the master 100c and the slave 200c having the same structure are coupled to each other, the master connector 170 and the slave connector 270c may be electrically connected to each other.

For compatibility with the coupling structure as described above, the connectors may be configured to have male and female structures. For example, when the master connector 170 has a female connector structure, the reduction input connector 616c and the slave connector 270c may have a male connector structure, and the reduction output connector 670c may have the female connector structure in the same way as the master 100c. It is natural that the opposite case is also possible.

Figure 42:
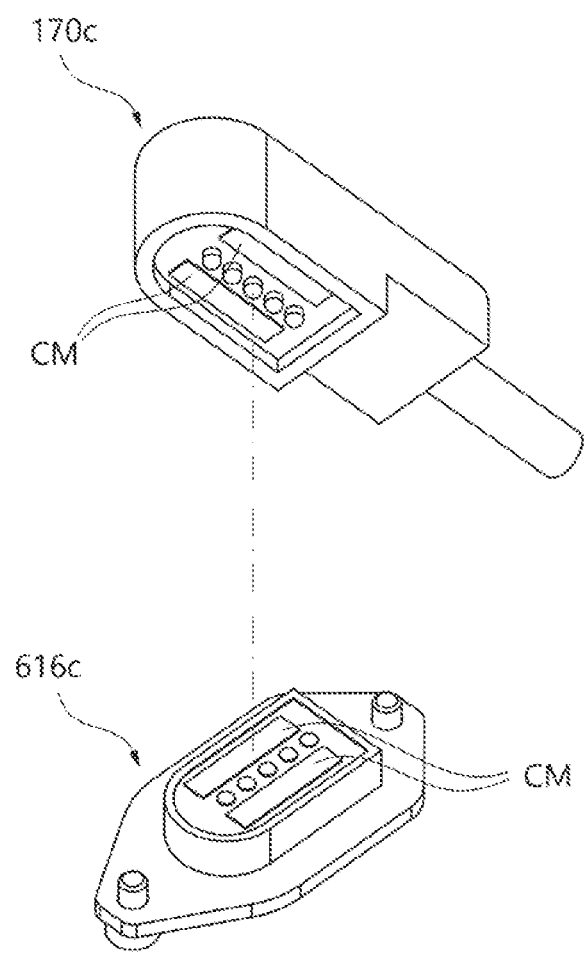
FIG. 42 is a view illustrating male and female connector structures of the tool changing system according to the fifth embodiment of the present disclosure.

FIG. 42 is a view illustrating male and female connector structures of the tool changing system according to the fifth embodiment of the present disclosure. FIG. 42 illustrates the master connector 170 and the reduction input connector 616c, and such structures may be applied to the reduction output connector 670c and the slave connector 270c in the same way.

In the embodiment illustrated in FIG. 42, the master connector 170 may have a female connector structure, and the reduction input connector 616c may have the male connector structure.

In the fifth embodiment of the present disclosure, a magnetic connector method using a connecting magnet is applied to the master connector 170 and the reduction input connector 616c. The same may be applied to the slave connector 270c and the reduction output connector 670c.

Accordingly, in a case in which magnetic connectors approach each other when the master 100c and the reducer 600c are coupled to each other, when the slave 200c and the reducer 600c are coupled to each other, or when the master 100c and the slave 200c are directly coupled to each other, contact of coupling magnets (CM) with each other installed on opposite sides may be automatically guaranteed by magnetism therebetween, thereby enabling a stable contact thereof.

Although the several embodiments of the present disclosure have been shown and described, those skilled in the art with ordinary skill in the technical field to which the present disclosure belongs will know that this embodiment may be modified without departing from the principles or spirit of the present disclosure. The scope of the present disclosure will be determined by the appended claims and their equivalents.

What is claimed is:

1. A tool changing system of a robot manipulator, the system comprising:
   a master coupled to the robot manipulator at a first side thereof and having a master coupling part at a second side thereof; and
   a slave coupled to a tool at a first side of the slave and having a slave coupling part at a second side of the slave, the slave coupling part being coupled removably to the master coupling part,
   wherein in a state in which the master coupling part and the slave coupling part are coupled to each other, transmission of rotating force between the master and the slave is performed by magnetism through magnetic coupling.

2. The system of claim 1, further comprising:
   a reducer having: a reduction input part coupled to the master coupling part; a reduction part reducing a rotating force transmitted from the master through the reduction input part; and a reduction output part provided to be coupled to the slave coupling part and transmitting the rotating force reduced by the reduction part to the slave,
   wherein when the master coupling part and the reduction input part are coupled to each other and the reduction output part and the slave coupling part are coupled to each other, a transmission of the rotating force between the master coupling part and the reduction input part and a transmission of the rotating force between the reduction output part and the slave coupling part are performed by the magnetism through the magnetic coupling.

3. The system of claim 2, wherein a coupling mechanism between the master coupling part and the reduction input part and a coupling mechanism between the reduction output part and the slave coupling part are formed to correspond to each other;
   a coupling structure of the master coupling part and the reduction output part is formed such that the master coupling part and the reduction output part correspond to each other, and a coupling structure of the reduction input part and the slave coupling part to each other is formed such that the reduction input part and the slave coupling part correspond to each other, so the master coupling part and the slave coupling part are coupled directly to each other.

4. The system of claim 3, wherein the master comprises:
   an actuator, and
   a master magnet rotated according to rotation of the actuator,
   wherein a slave output part of the slave comprises a slave magnet transmitting the rotating force to the tool;
   the reduction input part comprises a reduction input magnet rotated in synchronization with the rotation of the master magnet by magnetism therebetween when the reduction input part and the master coupling part are coupled to each other;
   the reduction output part comprises a reduction output magnet rotated by the rotating force decreased by the reduction part and rotating the slave magnet by magnetism therebetween when the reduction output part and the slave coupling part are coupled to each other.

5. The system of claim 4, wherein the master magnet and the reduction output magnet are provided to have a shape of one of a female magnet member having a cylindrical shape and a male magnet member having a cylindrical shape inserted to the female magnet member;
   the reduction input magnet and the slave magnet are provided to have a shape of a remaining one of the female magnet member and the male magnet member; and
   when the master coupling part and the reduction input part are coupled to each other, and when the reduction output part and the slave coupling part are coupled to each other, the male magnet member is inserted into the female magnet member to embody the magnetic coupling.

6. The system of claim 5, wherein each of the female magnet member and the male magnet member has an N-pole magnet and an S-pole magnet alternately formed along a circumferential direction thereof.

7. The system of claim 4, wherein the master magnet and the reduction input magnet are arranged to face each other when the master coupling part and the reduction input part are coupled to each other;
   the slave magnet and the reduction output magnet are arranged to face each other when the slave coupling part and the reduction output part are coupled to each other; and
   the master magnet and the slave magnet are arranged to face each other when the master coupling part and the slave coupling part are coupled to each other.

8. The system of claim 4, wherein magnetic attraction between the master magnet and the reduction input magnet is applied to maintain the coupling of the master and the reducer to each other;
   magnetic attraction between the slave magnet and the reduction output magnet is applied to maintain the coupling of the slave and the reducer to each other; and
   when the master coupling part and the slave coupling part are coupled to each other, magnetic attraction between the master magnet and the slave magnet is applied to maintain the coupling of the master and the slave to each other.

9. The system of claim 8, wherein the reducer further comprises a reducer removal prevention unit installed in the reduction output part, the reducer removal prevention unit preventing a removal of the slave by protruding from the reduction output part to the slave coupling part, with the reduction output part and the slave coupling part coupled to each other;

the master further comprises a master removal prevention unit installed in the master coupling part, the master removal prevention unit preventing a removal of the reducer by protruding from the master coupling part to the reduction input part, with the master coupling part and the reduction input part coupled to each other;

the slave further comprises a slave pin coupling groove formed in the slave coupling part, the slave pin coupling groove allowing the reducer removal prevention unit to be inserted thereto when the reduction output part and the slave coupling part are coupled to each other; and the reducer further comprises a reducer pin coupling groove formed in the reduction input part, the reducer pin coupling groove allowing the master removal prevention unit to be inserted thereto when the master and the reduction input part are coupled to each other.

10. The system of claim 9, wherein each of the master removal prevention unit and the reducer removal prevention unit comprises:

a pin module inserted into the reducer pin coupling groove or the slave pin coupling groove;

a pin receiving part receiving the pin module such that the pin module is exposed forward at a front end thereof and moves forward and rearward;

a removal prevention magnet coupled to a rear of the pin module; and a steel washer installed at a front of the pin receiving part such that the pin module is moved in a direction of being inserted to the reducer pin coupling groove or the slave pin coupling groove by magnetism of the removal prevention magnet.

11. The system of claim 10, further comprising:

a tool mount mounting the slave or the reducer thereto, wherein the reducer further comprises a reducer mounting groove formed by being recessed at an outer surface of the reduction part, the reducer mounting groove having a pair of reducer mounting grooves symmetrical to each other;

the slave further comprises a slave mounting groove formed by being recessed at an outer surface thereof, the slave mounting groove having a pair of slave mounting grooves symmetrical to each other; and an interval between the reducer pin coupling groove and the reducer mounting groove and an interval between the slave pin coupling groove and the slave mounting groove are provided to correspond to each other;

wherein the tool mount comprises:

a base plate;

a tool mounting part arranged to be spaced apart upward from the base plate and having a shape of a horseshoe open at a front of the tool mounting part;

a mounting rib inserted to the slave mounting groove or the reducer mounting groove when the slave or the reducer is introduced to the tool mounting part from the front thereof such that the slave or the reducer is mounted to the tool mounting part, the mounting rib protruding inward from an inner wall surface of the tool mounting part; and a driving magnet mounted to the tool mounting part and installed by being spaced apart from the mounting rib to correspond to an interval between the slave mounting groove of the slave and the reducer removal prevention unit of the reducer when the slave and the reducer are coupled to each other, wherein when the slave or the reducer is mounted to the tool mounting part, the pin module is moved back from the slave pin coupling groove or the reducer pin coupling groove by magnetism between the driving magnet and the removal prevention magnet, so the coupling of the slave and the reduction output part to each other or the coupling of the master and the reduction input part to each other is released.

12. The system of claim 4, wherein the reduction part comprises at least one planetary gear module shaft-coupled to the reduction input magnet and the reduction output magnet, the planetary gear module decreasing the rotating force of the reduction input magnet and transmitting the decreased rotating force to the reduction output magnet.

13. The system of claim 4, wherein the master coupling part comprises a master connector installed toward the reducer or the slave;

the reduction input part further comprises a reduction input connector installed toward the master and electrically connected to the master connector when the master coupling part and the reduction input part are coupled to each other;

the reduction output part further comprises a reduction output connector installed toward the slave and electrically connected to the reduction input connector; and the slave coupling part further comprises a slave connector installed toward the master or the reducer and electrically connected to the master connector or the reduction output connector when the slave coupling part is coupled to the master coupling part or the reduction output part.

14. The system of claim 8, wherein the master further comprises a slave removal prevention unit installed in the master coupling part, the slave removal prevention unit preventing a removal of the slave by protruding from the master coupling part to the slave coupling part, with the master coupling part and the slave coupling part fitted to each other.

15. The system of claim 14, wherein the master coupling part comprises:

a master coupling housing having an opening formed by being open to the slave and having the master magnet arranged inside the master coupling housing; and a master coupling cover blocking the opening of the master coupling housing and having a slave through hole formed therethrough, wherein the slave coupling part comprises a slave coupling housing having an opening formed by being open to the master, wherein the slave coupling housing has an outside size allowing the slave coupling housing to be inserted into the master coupling housing through the slave through hole, and has an inside size allowing the master magnet to be inserted into the slave coupling housing when the slave coupling housing is inserted into the master coupling housing.

16. The system of claim 15, wherein the slave coupling part further comprises at least one pin fastening hole formed through an outer side of the slave coupling housing from an inner side of the slave coupling housing in a radial direction thereof, and the slave removal prevention unit is inserted into the pin fastening hole with the slave coupling housing inserted into the master coupling housing.

17. The system of claim 16, wherein the slave removal prevention unit comprises:

a fastening pin installed to protrude inward from an inner wall surface of the master coupling housing and inserted into the pin fastening hole, and an elastic member pressing the fastening pin in a direction of inserting the fastening pin into the pin fastening hole.

* * * * *